US008689548B2

(12) United States Patent
Maehara et al.

(10) Patent No.: US 8,689,548 B2
(45) Date of Patent: Apr. 8, 2014

(54) POWER SYSTEM FOR VEHICLE AND VEHICLE HAVING THE POWER SYSTEM

(75) Inventors: Hayato Maehara, Wako (JP); Yasushi Fujimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1442 days.

(21) Appl. No.: 12/394,719

(22) Filed: Feb. 27, 2009

(65) Prior Publication Data

US 2009/0247361 A1 Oct. 1, 2009

(30) Foreign Application Priority Data

Mar. 31, 2008 (JP) .................................. 2008-092574

(51) Int. Cl.
*F16D 31/00* (2006.01)

(52) U.S. Cl.
USPC ............................................. 60/328; 60/454

(58) Field of Classification Search
USPC .......................... 60/328, 454, 435; 192/85.63
See application file for complete search history.

(56) References Cited

U.S. PATENT DOCUMENTS 6,443,278 B1 * 9/2002 Hori et al. .................... 192/3.58

FOREIGN PATENT DOCUMENTS

| JP | 03-104505 U | 10/1991 |
|---|---|---|
| JP | 6-270721 | 9/1994 |
| JP | 08-028239 | 1/1996 |
| JP | 2006-153091 | 6/2006 |

OTHER PUBLICATIONS

Japanese Office Action for corresponding JP Application No. 2008-092574, Mar. 16, 2012.

* cited by examiner

*Primary Examiner* — Edward Look
*Assistant Examiner* — Logan Kraft
(74) *Attorney, Agent, or Firm* — Ditthavong Mori & Steiner, P.C.

(57) ABSTRACT

A power system for a vehicle includes a hydraulic pressure generating device, a first hydraulically operated device, a second hydraulically operated device, a common oil channel, a first bifurcated oil channel, a second bifurcated oil channel, and an oil state detector. The first hydraulically operated device is configured to be operated by liquid supplied from the hydraulic pressure generating device. The second hydraulically operated device is configured to be operated by liquid supplied from the hydraulic pressure generating device. The common oil channel is connected to the hydraulic pressure generating device. The first bifurcated oil channel connects the common oil channel and the first hydraulically operated device. The second bifurcated oil channel connects the common oil channel and the second hydraulically operated device. The oil state detector is provided in the common oil channel and configured to detect the state of the liquid.

12 Claims, 16 Drawing Sheets

POWER SYSTEM FOR VEHICLE AND VEHICLE HAVING THE POWER SYSTEM

CROSS-REFERENCE TO RELATED APPLICATIONS

The present application claims priority under 35 U.S.C. §119 to Japanese Patent Application. No. 2008-092574, filed Mar. 31, 2008. The contents of this application are incorporated herein by reference in their entirety.

BACKGROUND OF THE INVENTION

1. Field of the Invention

The present invention relates to a power system for a vehicle, and a vehicle having the power system.

2. Discussion of the Background

JP-A-2006-153091 discloses a vehicle adapted to control a transmission using a hydraulic pressure, in which an oil temperature sensor for detecting the state of hydraulic oil is disposed in the vicinity of the transmission, and JP-A-6-270721 discloses a vehicle adapted to control a variable valve using the hydraulic pressure, in which the oil temperature sensor is disposed in the vicinity of the variable valve mechanism.

The contents of JP-A-2006-153091 and JP-A-6-270721 are incorporated herein by reference in their entirety.

However, in the configuration as disclosed in JP-A-2006-153091 and JP-A-6-270721, in which oil state detectors such as an oil temperature sensor, a hydraulic pressure sensor, a viscosity sensor, and so on are disposed in the vicinity of the hydraulically operated device such as the transmission and the variable valve mechanism operated using the hydraulic pressure, the oil state detectors are necessary for the respective hydraulically operated devices, so that the number of components increase.

SUMMARY OF THE INVENTION

According to one aspect of the present invention, a power system for a vehicle includes a hydraulic pressure generating device, a first hydraulically operated device, a second hydraulically operated device, a common oil channel, a first bifurcated oil channel, a second bifurcated oil channel, and an oil state detector. The first hydraulically operated device is configured to be operated by liquid supplied from the hydraulic pressure generating device. The second hydraulically operated device is configured to be operated by liquid supplied from the hydraulic pressure generating device. The common oil channel is connected to the hydraulic pressure generating device. The first bifurcated oil channel connects the common oil channel and the first hydraulically operated device. The second bifurcated oil channel connects the common oil channel and the second hydraulically operated device. The oil state detector is provided in the common oil channel and configured to detect the state of the liquid.

According to another aspect of the present invention, a vehicle includes a hydraulic pressure generating device, a first hydraulically operated device, a second hydraulically operated device, a common oil channel, a first bifurcated oil channel, a second bifurcated oil channel, and an oil state detector. The first hydraulically operated device is configured to be operated by liquid supplied from the hydraulic pressure generating device. The second hydraulically operated device is configured to be operated by liquid supplied from the hydraulic pressure generating device. The common oil channel is connected to the hydraulic pressure generating device. The first bifurcated oil channel connects the common oil channel and the first hydraulically operated device. The second bifurcated oil channel connects the common oil channel and the second hydraulically operated device. The oil state detector is provided in the common oil channel and configured to detect the state of the liquid.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENT

Figure 1:
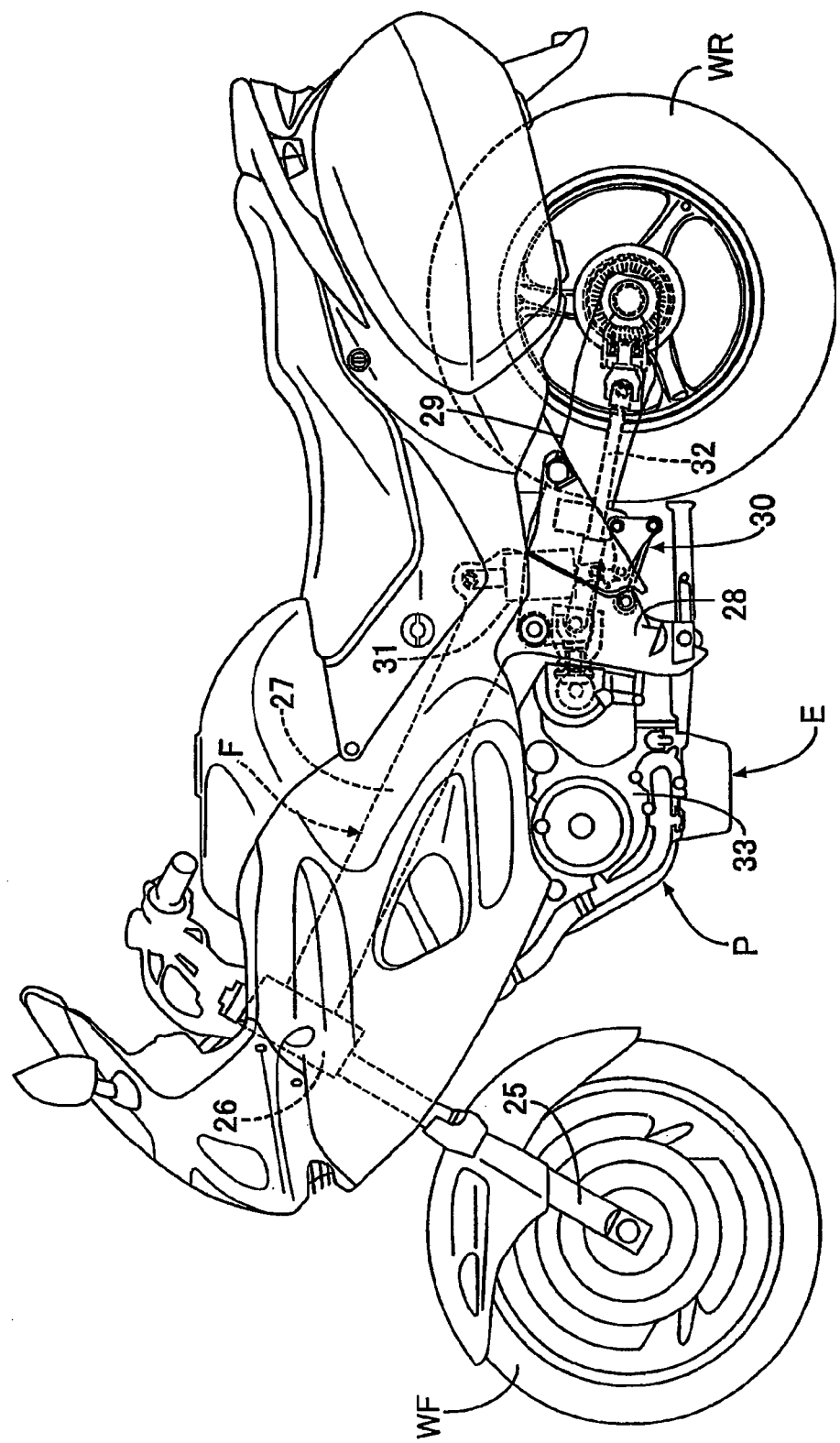
FIG. 1 is a left side view of a motorcycle according to a first embodiment of the present invention.

Embodiments will now be described with reference to the accompanying drawings, wherein like reference numerals designate corresponding or identical elements throughout the various drawings.

Figure 2:
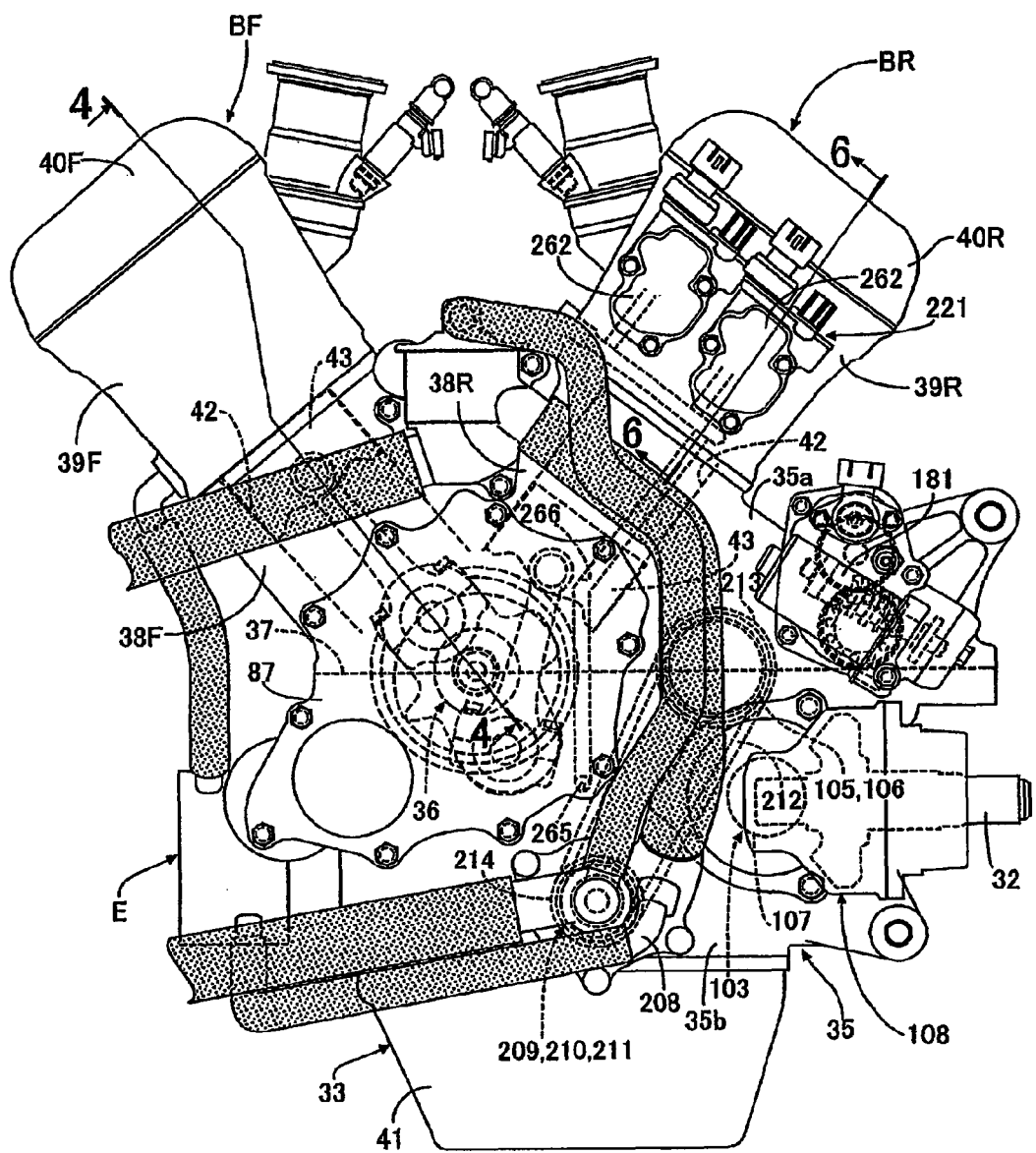
FIG. 2 is a left side view of a power system according to an embodiment of the present invention.
Figure 3:
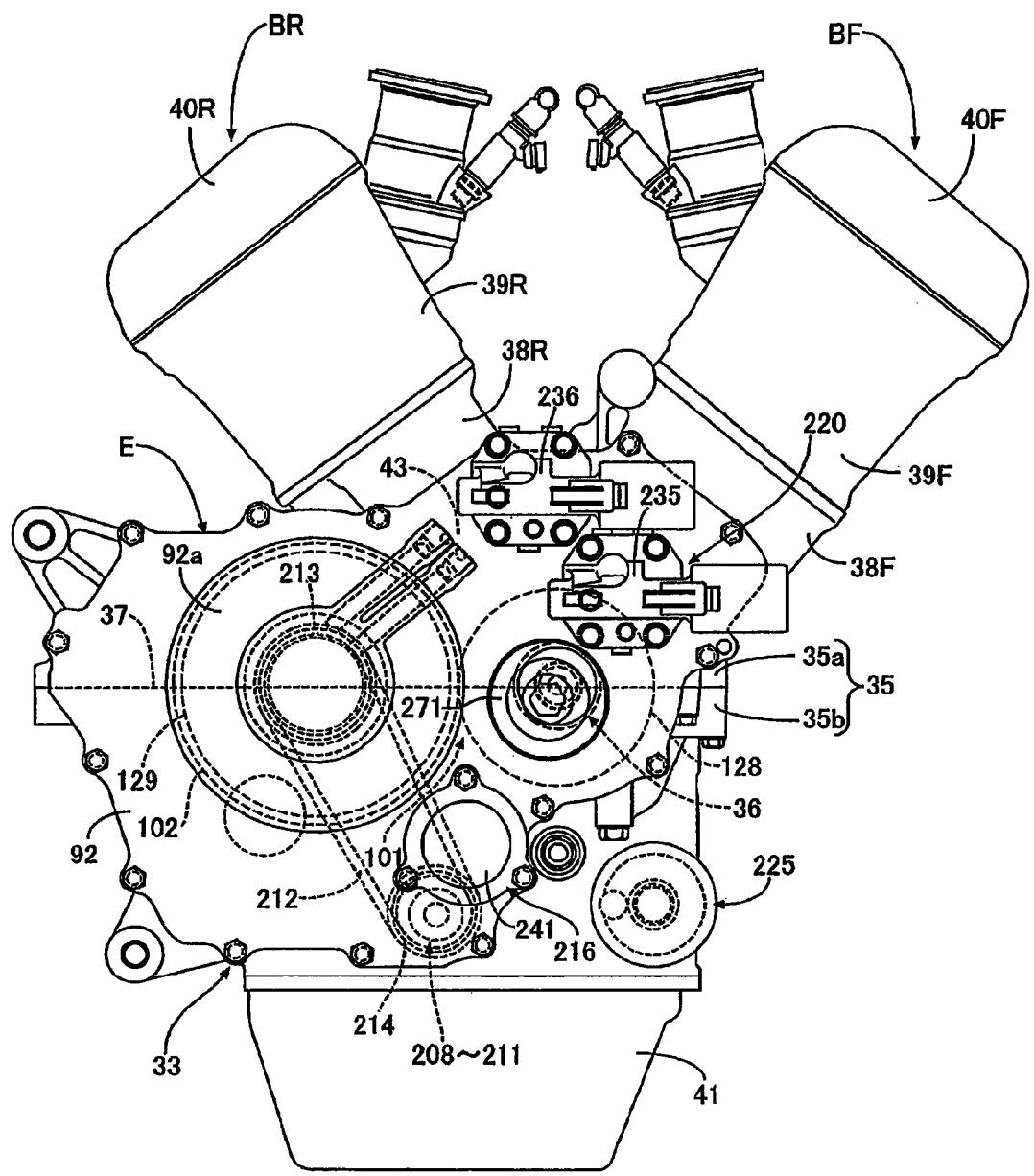
FIG. 3 is a right side view of the power system.
Figure 4:
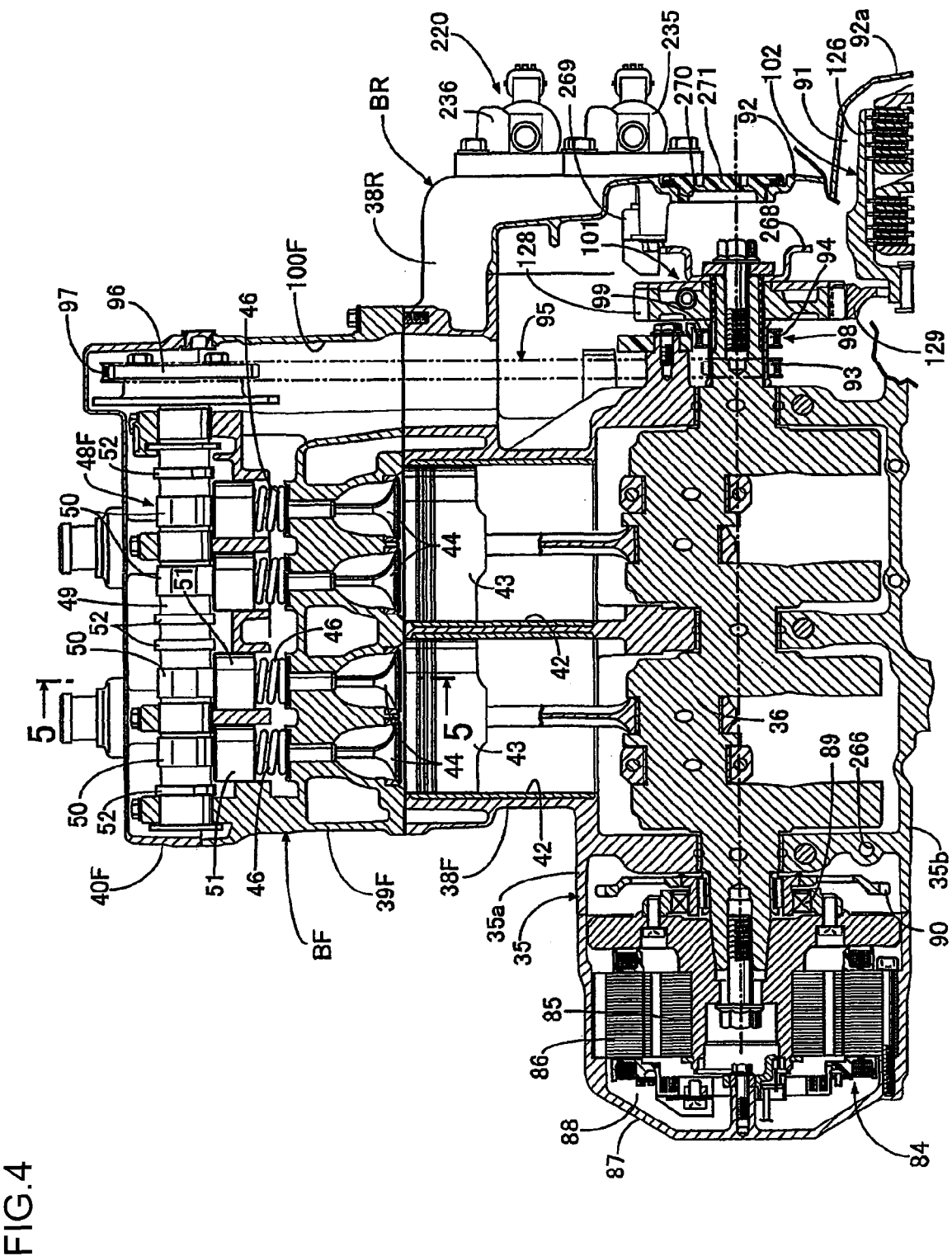
FIG. 4 is a cross-sectional view taken along the line 4-4 in FIG. 2.
Figure 5:
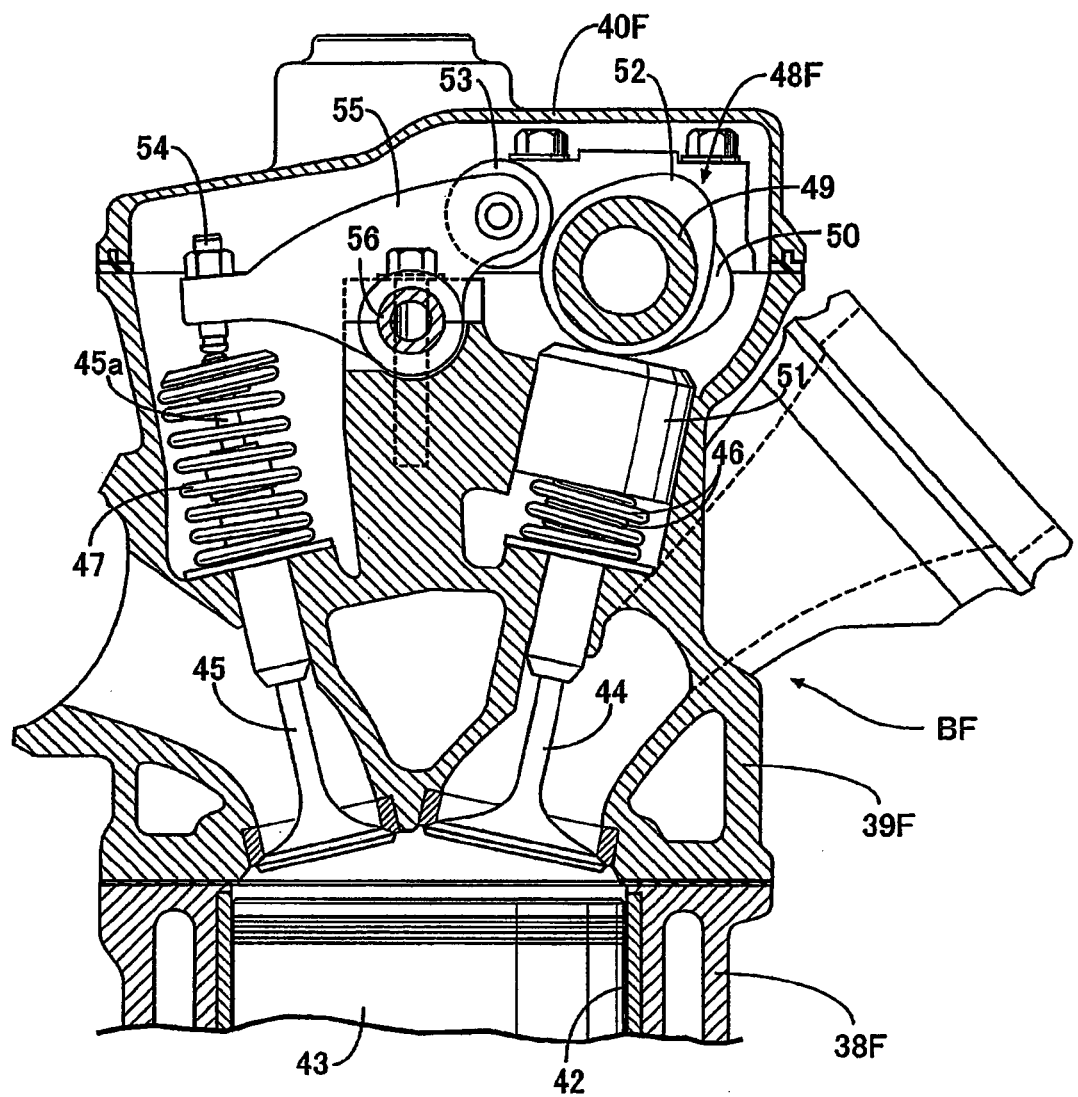
FIG. 5 is a cross-sectional view taken along the line 5-5 in FIG. 4.
Figure 6:
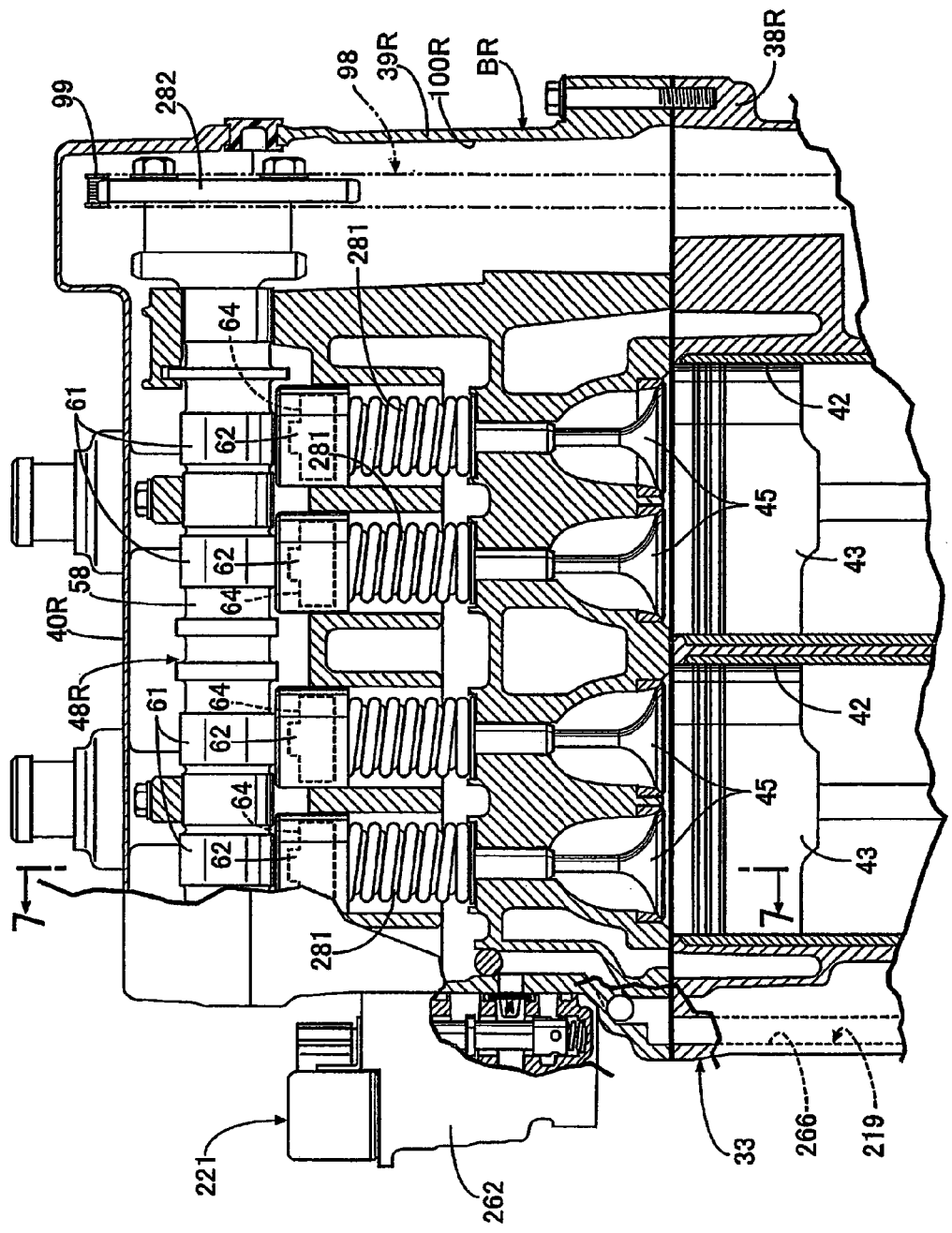
FIG. 6 is a cross-sectional view taken along the line 6-6 in FIG. 2.
Figure 7:
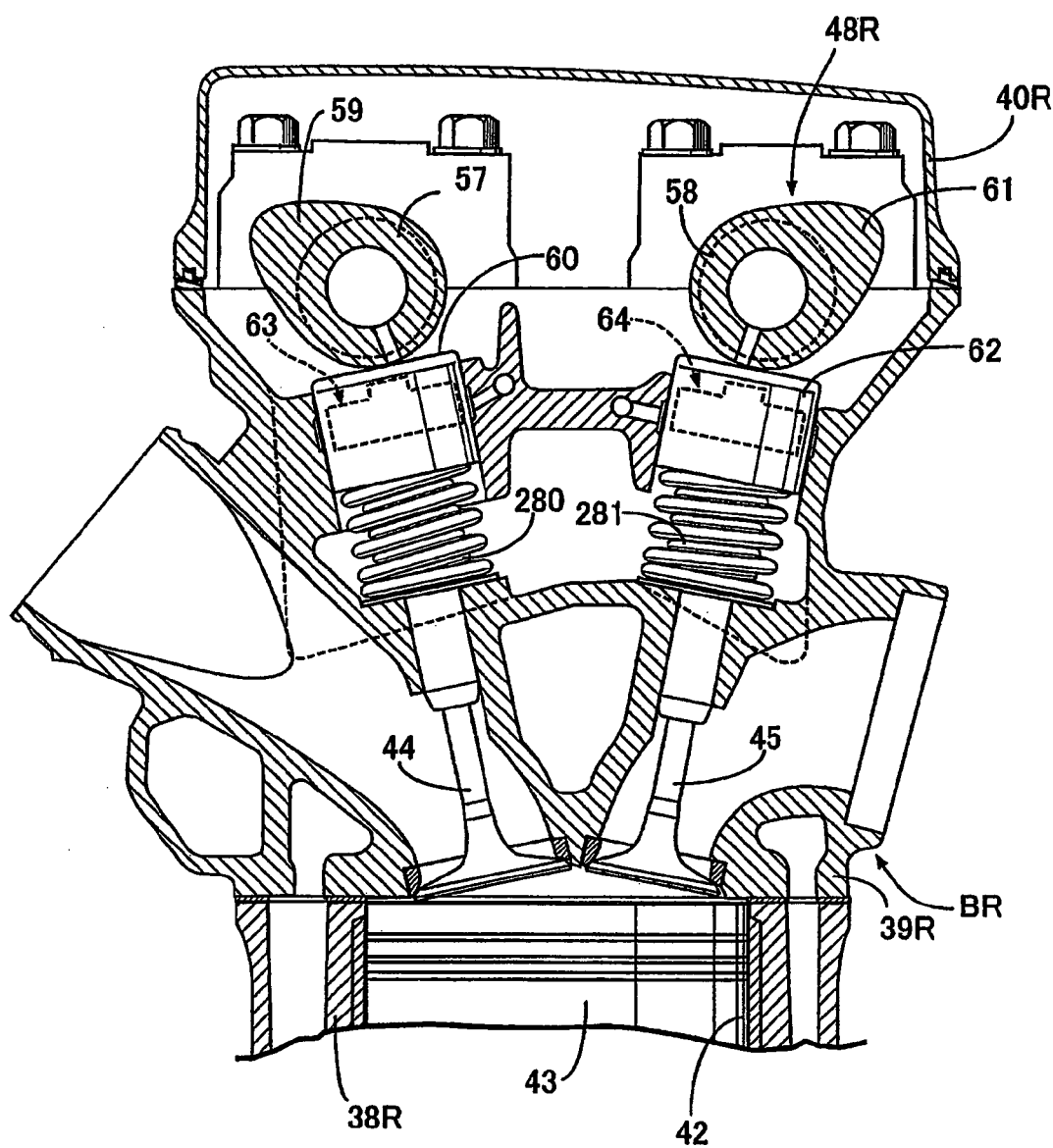
FIG. 7 is a cross-sectional view taken along the line 7-7 in FIG. 6.
Figure 8:
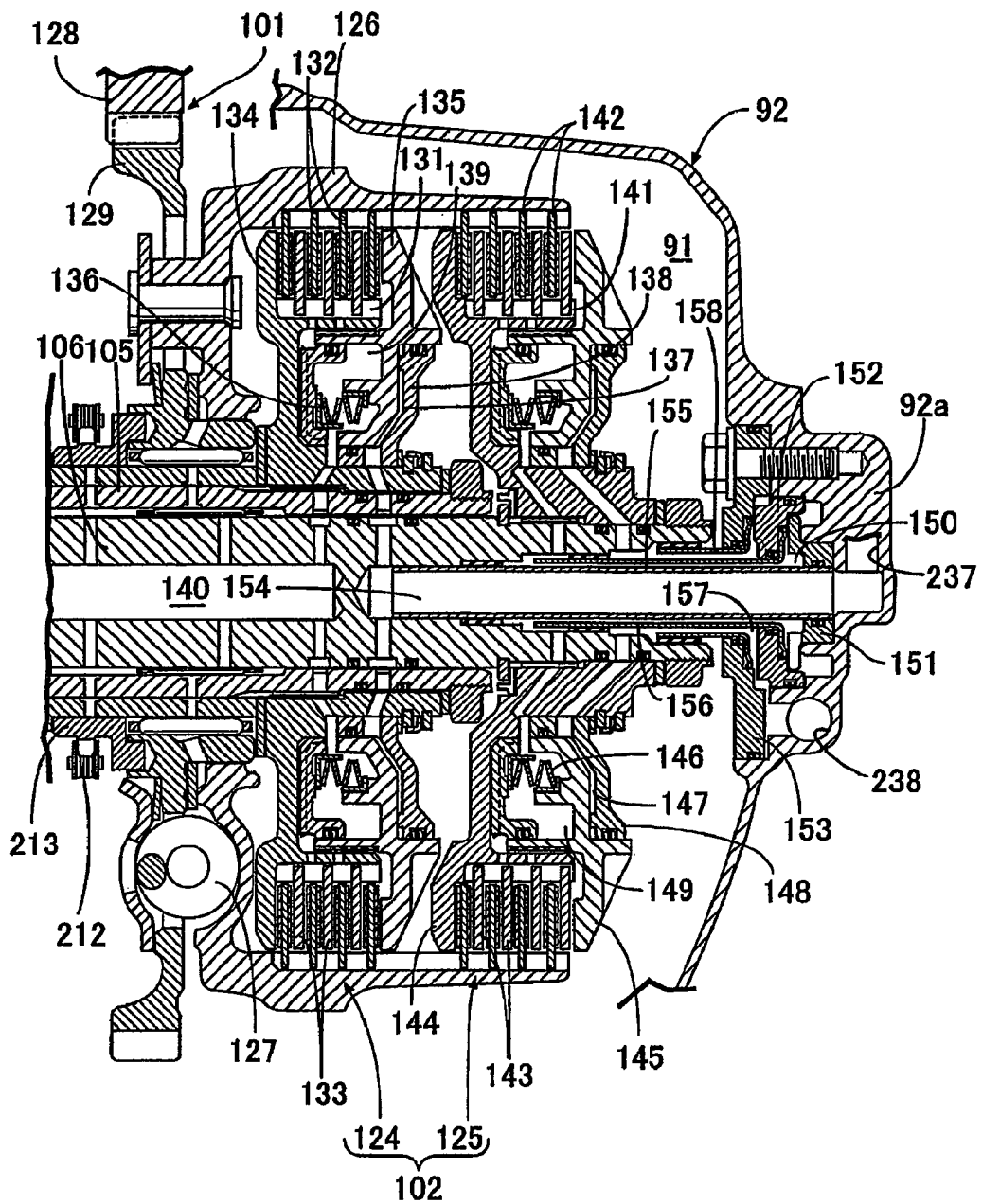
FIG. 8 is a vertical cross-sectional view of a clutch device.
Figure 9:
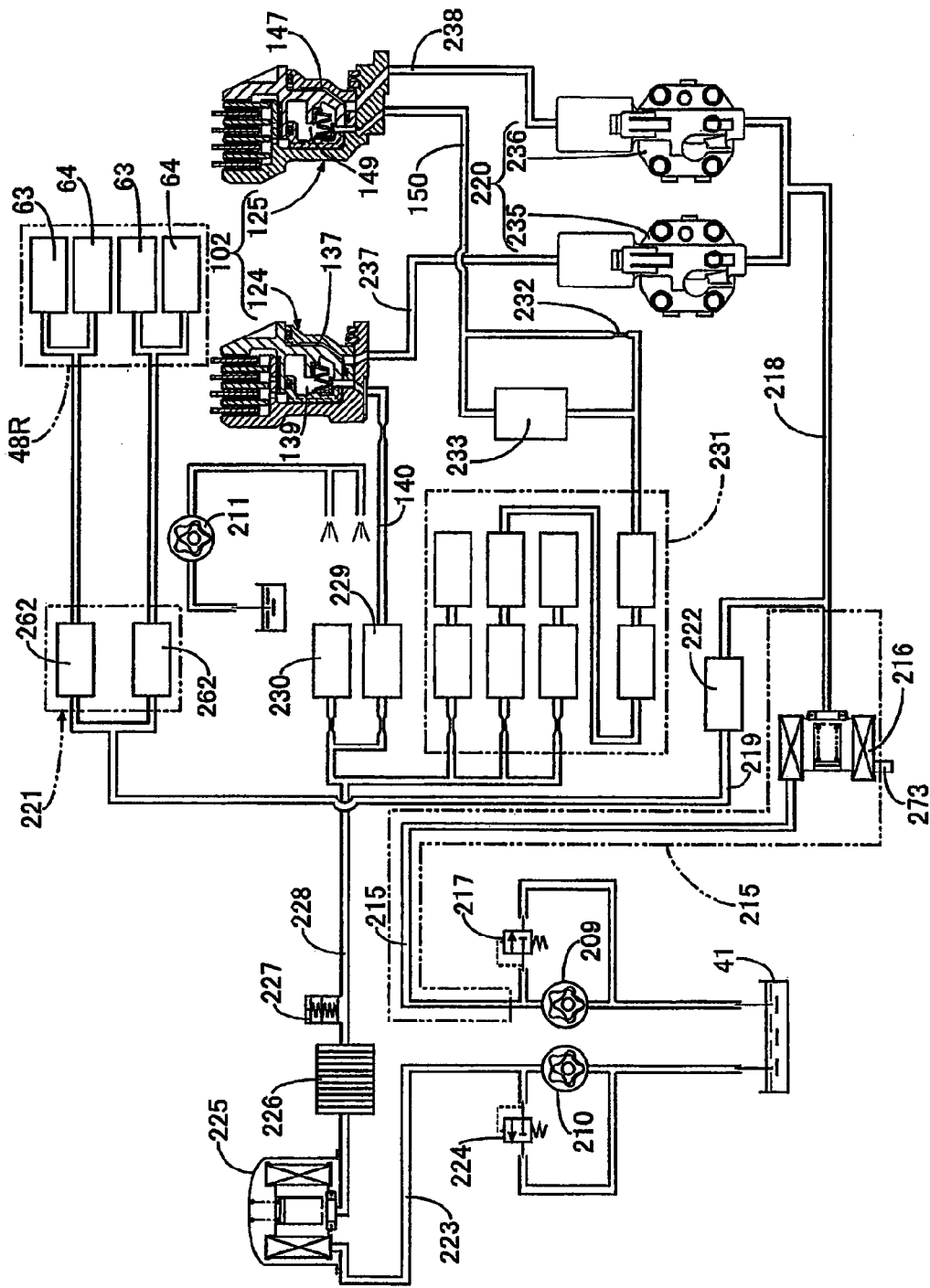
FIG. 9 is a system diagram showing a configuration of a hydraulic system.
Figure 10:
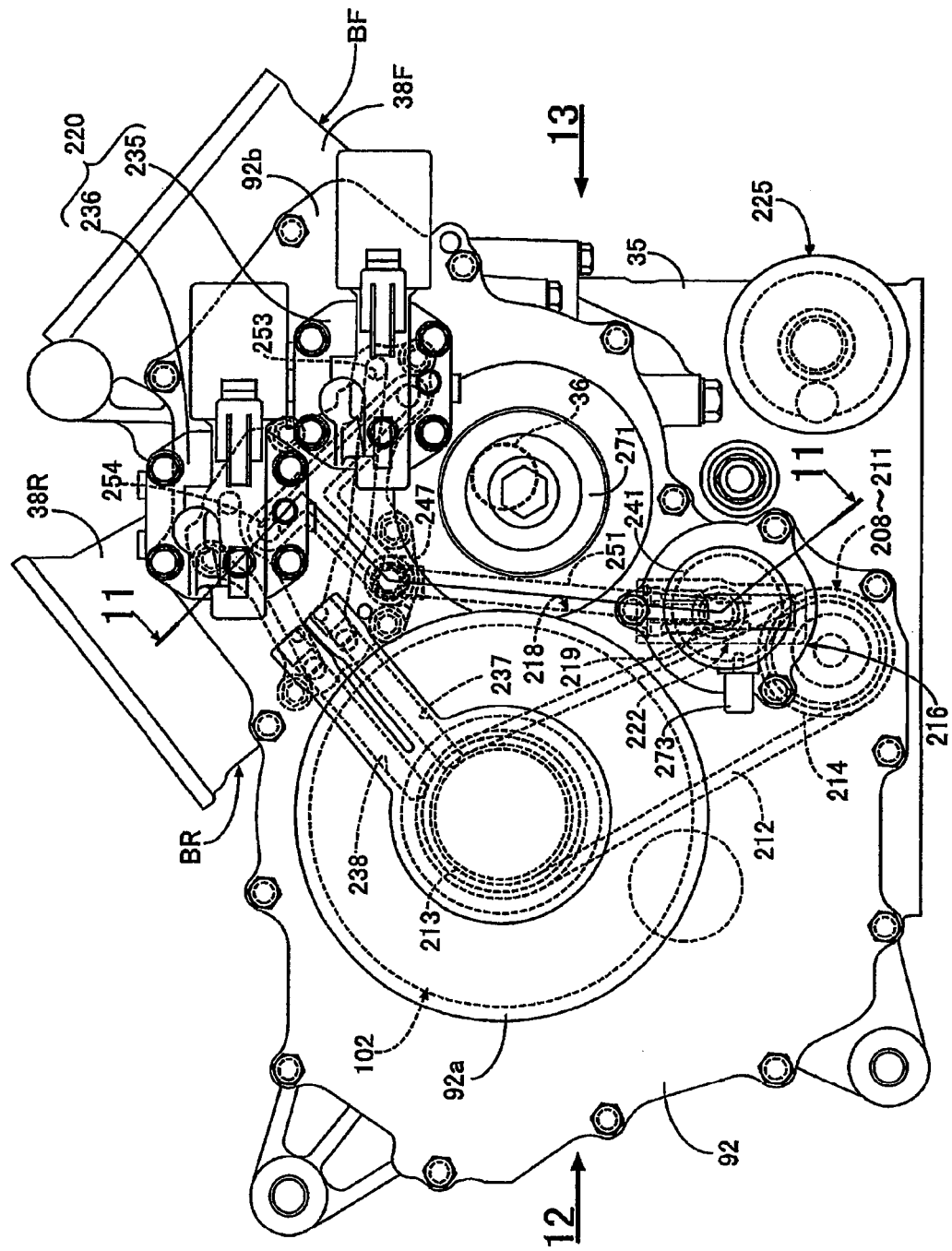
FIG. 10 is an enlarged view of a principal portion of FIG. 3.
Figure 11:
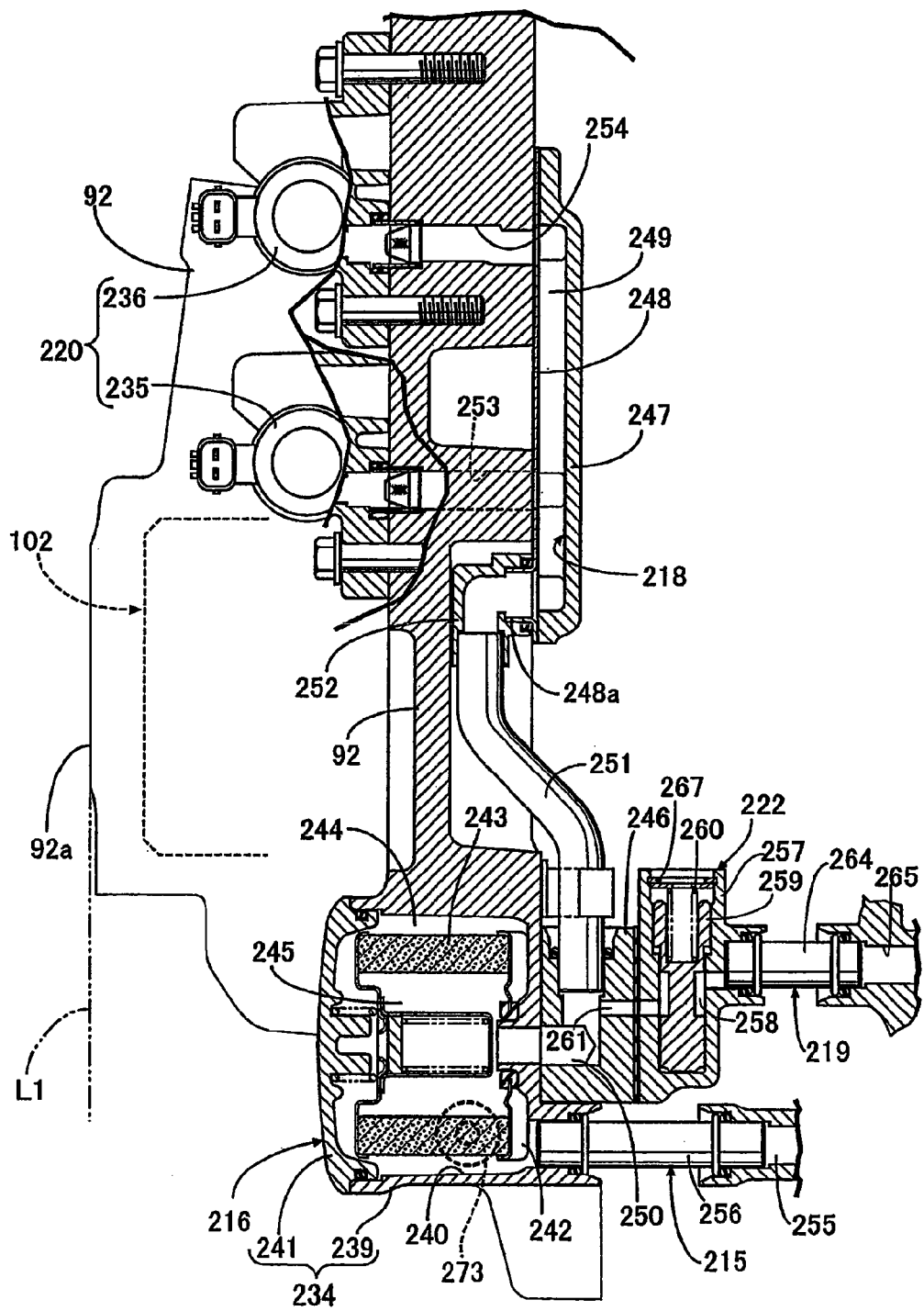
FIG. 11 is a cross-sectional view taken along the line 11-11 in FIG. 10.
Figure 12:
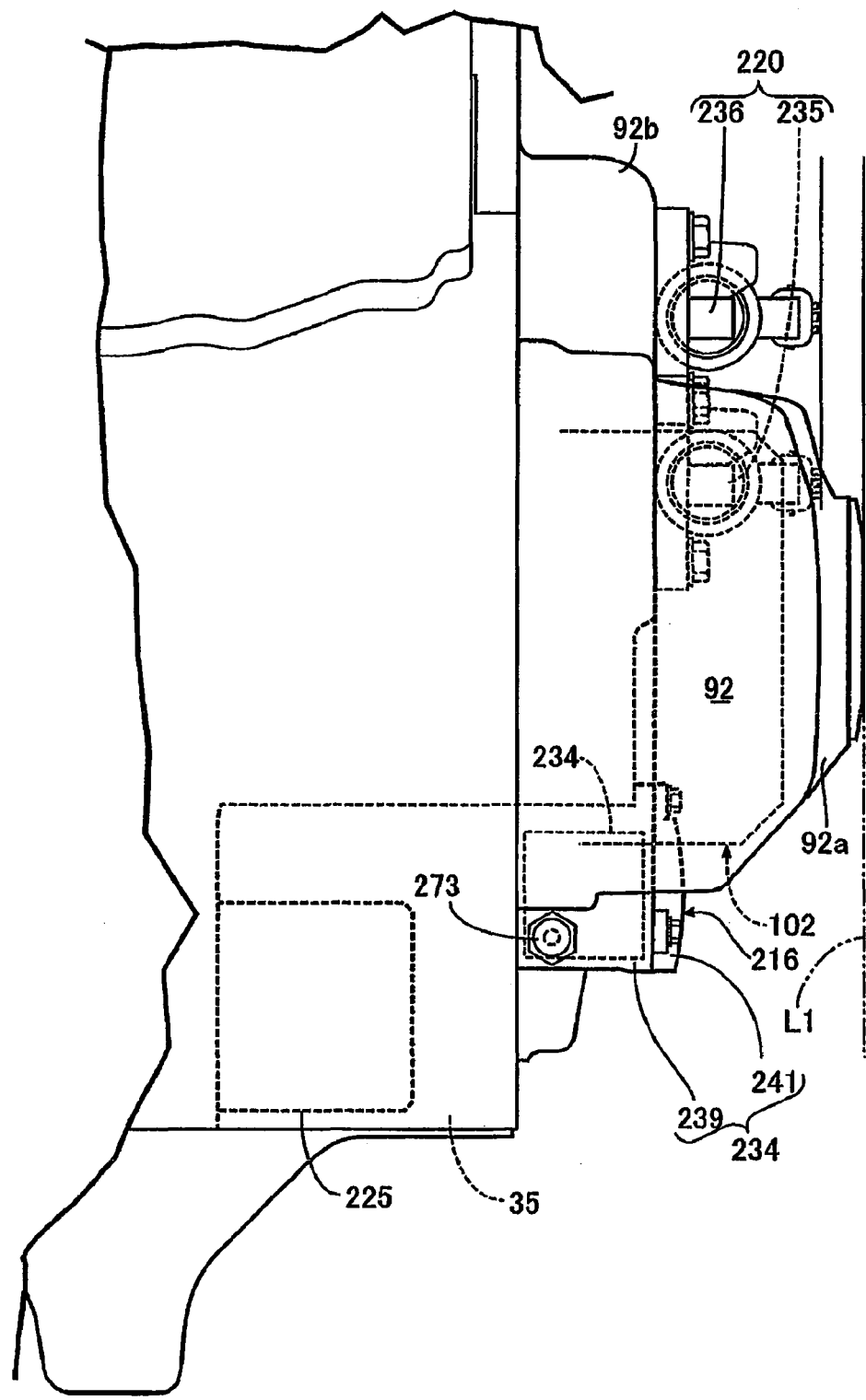
FIG. 12 is a drawing corresponding to FIG. 10 viewed in the direction indicated by an arrow 12.
Figure 13:
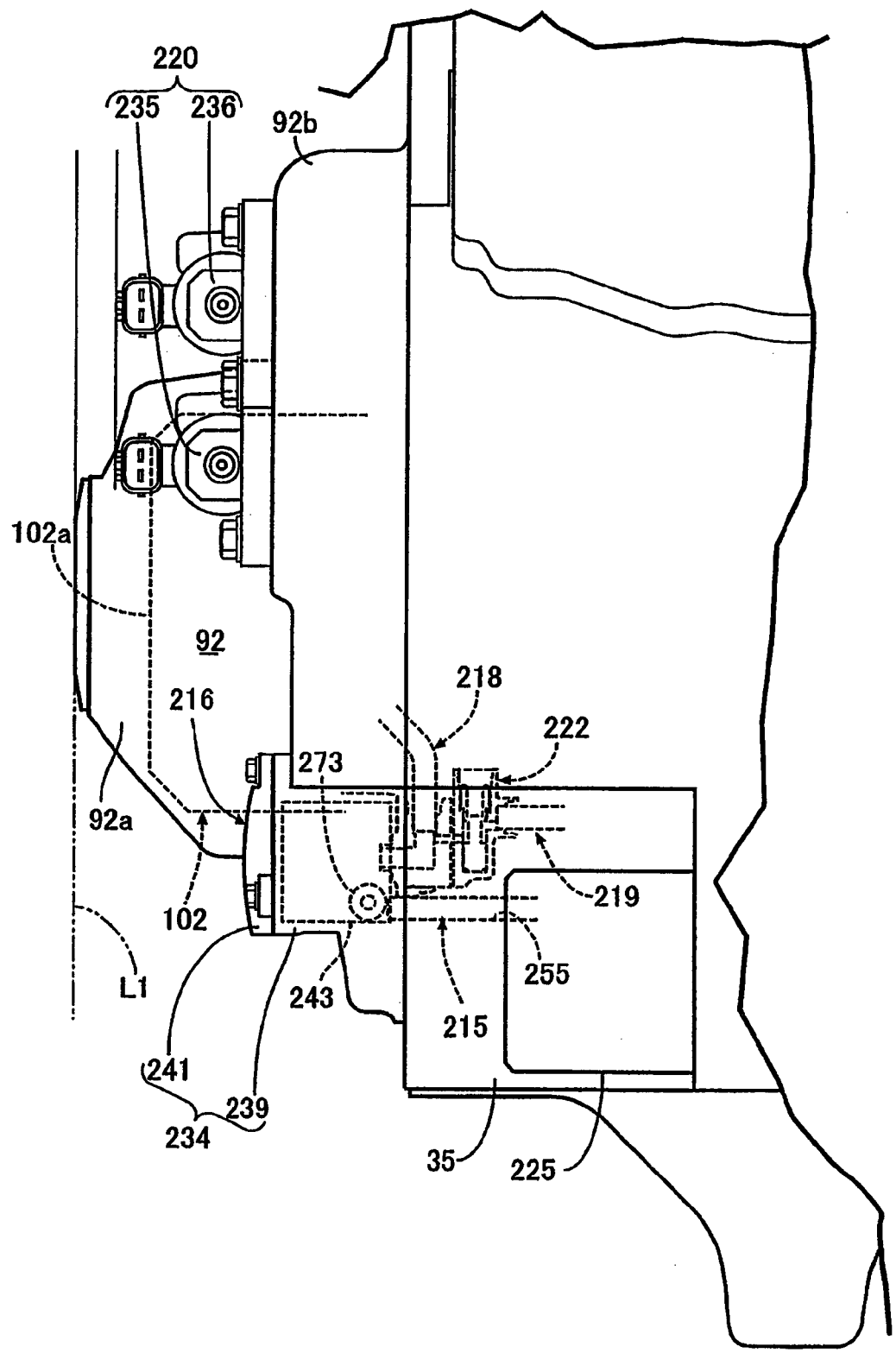
FIG. 13 is a drawing corresponding to FIG. 10 viewed in the direction indicated by an arrow 13.

FIG. 1 to FIG. 13 show a first embodiment of the present invention. FIG. 1 is a left side view of a motorcycle; FIG. 2 is a left side view of a power system; FIG. 3 is a right side view of the power system; FIG. 4 is a cross-sectional view taken along the line 4-4 in FIG. 2; FIG. 5 is a cross-sectional view taken along the line 5-5 in FIG. 4; FIG. 6 is a cross-sectional view taken along the line 6-6 in FIG. 2; FIG. 7 is a cross-sectional view taken along the line 7-7 in FIG. 6; FIG. 8 is a vertical cross-sectional view of a clutch device; FIG. 9 is a system diagram showing a configuration of a hydraulic system; FIG. 10 is an enlarged view of a principal portion of FIG. 3; FIG. 11 is a cross-sectional view taken along the line 11-11 in FIG. 10; FIG. 12 is a drawing corresponding to FIG. 10 viewed in the direction indicated by an arrow 12; FIG. 13 is a drawing corresponding to FIG. 10 viewed in the direction indicated by an arrow 13.

In FIG. 1, a vehicle body frame F of a motorcycle which is a saddle type vehicle includes a head pipe 26 which steerably supports a front fork 25 for rotatably supporting a front wheel WF, a pair of left and right main frames 27 extending downward toward the rear from the head pipe 26, and a pair of left and right pivot plates 28 being connected to rear portions of the both main frames 27 and extending downward, and a rear wheel WR is rotatably supported at a rear portion of a swing arm 29 which is pivotably supported at a front end thereof by the pivot plates 28. In addition, a link 30 is provided between the lower portion of the pivot plates 28 and the front portion of the swing arm 29, and a cushion system 31 is provided between the upper portion of the pivot plates 28 and the link 30.

A power system P is mounted by being suspended by the main frames 27 and the pivot plates 28, and a rotational power outputted from the power system P is transmitted to the rear wheel WR via a drive shaft 32 which extends horizontally.

In FIG. 2 and FIG. 3, the power system P includes an engine E, and an engine body 33 of the engine E includes a front bank BF positioned in the front in a state of being mounted on the motorcycle and a rear bank BR positioned rearwardly of the front bank BF, thereby being configured as a V-shaped water-cooling system, and a crankshaft 36 extending along the lateral direction of the motorcycle is rotatably supported by a crankcase 35 which is common for the both banks BF, BR.

The crankcase 35 includes an upper case half 35a and a lower case half 35b coupled together, and the both banks BF, BR are formed integrally with the upper case half 35a in a V-shape, and the axial line of the crankshaft 36 is arranged on a coupled plane 37 of the upper case half 35a and the lower case half 35b.

The front bank BF includes a front cylinder block 38F integrally continuing to the upper case half 35a of the crankcase 35, a front cylinder head 39F coupled to the front cylinder block 38F, and a front head cover 40F coupled to the front cylinder head 39F, and the rear bank BR includes a rear cylinder block 38R integrally continuing to the upper case half 35a of the crankcase 35, a rear cylinder head 39R connected to the rear cylinder block 38R, and a rear head cover 40R coupled to the rear cylinder head 39R, and an oil pan 41 is connected to the lower portion of the crankcase 35.

The front cylinder block 38F is formed with two cylinder bores 42 aligned in the axial direction of the crankshaft 36, and the front cylinder block 38F is coupled to the crankcase 35 in such a manner that the axial lines of the cylinder bores 42 are sloped upward toward the front in a state of being suspended from the vehicle body frame F of the engine body 33. The rear cylinder block 38R is formed with the two cylinder bores 42 aligned in the axial direction of the crankshaft 36, and the rear cylinder block 38R is coupled to the crankcase 35 in such a manner that the axial lines of the cylinder bores 42 are sloped upward toward the rear in a state of being suspended from the vehicle body frame F of the engine body 33. Therefore, pistons 43 slidably fitted respectively to the both cylinder bores 42 of the front bank BF and pistons 43 slidably fitted respectively to the both cylinder bores 42 of the rear bank BR are connected commonly to the crankshaft 36.

In FIG. 4 and FIG. 5, in the front cylinder head 39F, one pair each of intake valves 44 being urged by valve springs 46 in the closing direction and one pair each of exhaust valves 45 being urged by valve springs 47 in the closing direction are disposed in the respective cylinder bores 42 so as to be capable of opening and closing, and the intake valves 44 and the exhaust valves 45 are driven to open and close by a front-bank-side valve mechanism 48F.

The front-bank-side valve mechanism 48F includes a cam shaft 49 having an axial line parallel to the crankshaft 36, being rotatably supported by the front cylinder head 39F and being arranged above the intake valves 44, intake-side valve lifters 51 interposed between a plurality of (four in this embodiment) intake-side cams 50 provided on the cam shaft 49 and the intake valves 44 and slidably fitted to the front cylinder head 39F, and rocking arms 55 having rollers 53 which come into rolling contact with a plurality of (four in this embodiment) exhaust side cams 52 provided on the cam shaft 49 at one end and tappet screws 54 which come into abutment with upper ends of stems 45a of the respective exhaust valves 45 screwed at the other end so as to be adjustable in the fore-and-aft position, and is rockably supported by a rocking shaft 56 having an axial line parallel to the cam shaft 49 and being fixedly arranged on the front cylinder head 39F.

In FIG. 6 and FIG. 7, in the rear cylinder head 39R, one pair each of intake valves 44 and one pair each of exhaust valves 45 being urged by valve springs 280, 281 in the closing direction are disposed in the respective cylinder bores 42 so as to be capable of opening and closing, and the intake valves 44 and the exhaust valves 45 are driven to open and close by a rear-bank-side valve mechanism 48R.

The rear-bank-side valve mechanism 48R includes an intake-side camshaft 57 having an axial line parallel to the crankshaft 36, being rotatably supported by the rear cylinder head 39R, and being arranged above the intake valves 44, an exhaust-side camshaft 58 having an axial line parallel to the crankshaft 36, being rotatably supported by the rear cylinder head 39R, and being arranged above the exhaust valves 45, intake-side valve lifters 60 interposed between a plurality of (four in this embodiment) intake-side cams 59, provided on the intake-side camshaft 57 and the intake valves 44, and slidably fitted to the rear cylinder head 39R, and exhaust-side valve lifters 62 interposed between a plurality of (four in this embodiment) exhaust-side cams 61, provided on the exhaust-side camshaft 58 and the exhaust valves 45 and slidably fitted to the rear cylinder head 39R.

In the rear-bank-side valve mechanism 48R, intake-side valve operating state changing mechanisms 63 which are able to switch the operating state of the intake valves 44 of two cylinders of the rear bank BR between the openable-and-closable state and the closed-and-resting state are provided in association with the intake-side valve lifters 60, and exhaust-side valve operating state changing mechanisms 64 which are able to switch the operating state of the exhaust valves 45 of two cylinders between the openable-and-closable state and the closed-and-resting state are provided in association with the exhaust-side valve lifters 62.

The intake-side valve operating state changing mechanisms 63 and the exhaust-side valve operating state changing mechanisms 64 are capable of switching the operating state of the valves between the closed-and-resting state in which transmission of operating forces of the intake-side valve lifters 60 and the exhaust-side valve lifters 62 driven by the intake-side cams 59 and the exhaust-side cams 61 into a sliding movement to the intake valves 44 and the exhaust valves 45 is blocked to maintain the intake valves 44 and the exhaust valves 45 in the closed-and-resting state when a high hydraulic pressure is applied and the openable-and-closable state in which the operating forces of the intake-side valve lifters 60 and the exhaust-side valve lifters 62 are transmitted to the intake valves 44 and the exhaust valves 45 to cause the intake valves 44 and the exhaust valves 45 to open and close when the hydraulic pressure to be applied is lowered, and the rear-bank-side valve mechanism 48R is capable of switching the state between a state in which the intake valves 44 and the exhaust valves 45 of the two cylinders of the rear bank BR are opened and closed under the control of the intake-side valve operating state changing mechanisms 63 and the exhaust-side valve operating state changing mechanisms 64, and a state in which the intake valves 44 and the exhaust valves 45 of the two cylinders of the rear bank BR are closed and rested to bring the cylinders into a resting state.

Returning back to FIG. 4, a power generator 84 is connected to a left side end of the crankshaft 36 in a state in which the engine body 33 is mounted on the vehicle body frame F, and the power generator 84 includes a rotor 85 to be fixed to the crankshaft 36 and a stator 86 to be fixedly arranged in the rotor 85, and is stored in a power generator storage chamber 88 which includes the crankcase 35 and a power generator cover 87 to be coupled to a left side surface of the crankcase 35, and the stator 86 is fixed to the power generator cover 87.

A gear 90 is connected to the rotor 85 via an one-way clutch 89 which is capable of transmitting a power to the rotor 85 side, and a power from a starting motor, not shown, is transmitted to the gear 90.

On the other hand, a clutch cover 92 which defines a clutch chamber 91 with the crankcase 35 is coupled to the right side surface of the crankcase 35 in a state in which the engine body 33 is mounted on the vehicle body frame F, and drive sprockets 93, 94 are fixedly mounted on the crankshaft 36 in the clutch chamber 91. One of the drive sprockets 93 constitutes a part of a front-bank-side timing-control transmission mechanism 95 which transmits the rotational power of the crankshaft 36 to the cam shaft 49 of the front-bank-side valve mechanism 48F at a reduction gear ratio of ½, and the front-bank-side timing-control transmission mechanism 95 includes the drive sprockets 93, and a driven sprocket 96 provided at one end of the cam shaft 49 (the right end when the power system P is mounted on the vehicle body frame F) and an endless cam chain 97 wound around these sprockets.

The other drive sprocket 94 constitutes a part of a rear-bank-side timing-control transmission mechanism 98 which transmits the rotational power of the crankshaft 36 to the intake-side and exhaust-side camshafts 57, 58 of the rear-bank-side valve mechanism 48R at a reduction gear ratio of 1/2, and the rear-bank-side timing-control transmission mechanism 98 includes the drive sprocket 94, driven sprockets 282 provided respectively at the one end portions (right end when the power system P is mounted on the vehicle body frame F) of the intake-side and exhaust-side camshafts 57, 58, as shown in FIG. 6 and an endless cam chain 99 wound around these sprockets.

Therefore, the front cylinder block 38F and the front cylinder head 39F are formed with a cam chain chamber 100F for allowing the cam chain 97 to travel, and the rear cylinder block 38R and the rear cylinder head 39R are formed with a cam chain chamber 100R for allowing the cam chain 99 to travel.

Referring also to FIG. 8, a power transmission path between the crankshaft 36 and the rear wheel WR includes a primary reduction device 101, a clutch device 102, a gear transmission mechanism 103 (see FIG. 2), and the drive shaft 32 (see FIG. 1) in sequence from the crankshaft 36 side. The primary reduction device 101 and the clutch device 102 are stored in the clutch chamber 91, and the gear transmission mechanism 103 is stored in the crankcase 35.

The gear transmission mechanism 103 includes a gear train which is able to selectively establish a plurality of gear speeds between the coaxially arranged first and second main shafts 105, 106 and a counter shaft 107 (see FIG. 2). The first and second main shafts 105, 106 and the counter shaft 107 have axes extending in parallel with the crankshaft 36, and the power transmitted to the counter shaft 107 is converted into a rotational power about an axial line extending in the fore-and-aft direction which is orthogonal to the crankshaft 36 by a bevel gear mechanism 108 (see FIG. 2), and the rotational power is transmitted to the rear wheel WR via the drive shaft 32.

The selective establishment of the gear train in the plurality of gear speeds provided by the gear transmission mechanism 103 is switched by the operation of a shift driving electric motor 181 (see FIG. 2) mounted on the left side surface of the crankcase 35 in the state in which the engine body 33 is mounted on the vehicle body frame F.

In FIG. 8, the clutch device 102 includes first and second clutches 124, 125 provided between the gear transmission mechanism 103 and the crankshaft 36 and configured into a twin type. The first clutch 124 is provided between the crankshaft 36 and one end of the first main shaft 105, and the second clutch 125 is provided between the crankshaft 36 and one end of the second main shaft 106. Therefore, the power from the crankshaft 36 is entered to a clutch outer 126, which is common to the first and second clutches 124, 125 via the primary reduction device 101 and a damper spring 127.

The primary reduction device 101 includes a drive gear 128 provided on the crankshaft 36 at a position outwardly of the drive sprocket 94 and a driven gear 129 supported by the first main shaft 105 so as to be capable of rotating with respect to each other and engages the drive gear 128, and the driven gear 129 is connected to the clutch outer 126 via the damper spring 127.

A pulser 268 is mounted on the axial end of the crankshaft 36 at a position outwardly of the primary reduction device 101 as shown in FIG. 4, and a revolving speed detector 269 that detects the number of revolution of the crankshaft 36 by detecting the pulser 268 is mounted on the inner surface of the clutch cover 92. The clutch cover 92 is provided with an inspection hole 270 for inspecting the pulser 268, and the inspection hole 270 is provided on the clutch cover 92 at a position deviated from the axial line of the crankshaft 36 so as to reduce the diameter thereof as much as possible, and the inspection hole 270 is closed by a detachable lid member 271.

The first clutch 124 includes the clutch outer 126, a first clutch inner 131 coaxially surrounded by the clutch outer 126 and coupled with the first main shaft 105 so as not to be capable of rotating with respect to each other, a plurality of first friction discs 132 engaged with the clutch outer 126 so as not to be capable of rotating with respect to each other, a plurality of second friction discs 133 engaged with the first clutch inner 131 so as not to be capable of rotating with respect to each other and arranged alternately with the first friction discs 132, a first pressure receiving plate 134 provided on the first clutch inner 131 so as to oppose the first and second friction discs 132, 133 arranged so as to be overlapped with each other, a first piston 135 which interposes the first and second friction discs 132, 133 between the first pressure receiving plate 134 and the first piston 135 itself, and a first spring 136 which urges the first piston 135.

An end wall member 138 which defines a first hydraulic chamber 137 to which the back surface of the first piston 135 faces between the first piston 135 and the end wall member 138 itself is fixedly disposed on the first clutch inner 131, and the first piston 135 moves so as to sandwich with a pressure the first and second friction discs 132, 133 with the first pressure receiving plate 134 with the increase in hydraulic pressure in the first hydraulic chamber 137, whereby a state where the first clutch 124 transmits the power transmitted from the crankshaft 36 to the clutch outer 126 to the first main shaft 105 is assumed. A canceller chamber 139 to which the front surface of the first piston 135 faces is formed between the first clutch inner 131 and the first piston 135, and the first spring 136 is stored in the canceller chamber 139 so as to demonstrate its spring force in the direction to reduce the capacity of the first hydraulic chamber 137.

The canceller chamber 139 is in communication with a first oil chamber 140 provided coaxially with the second main shaft 106 for supplying oil to respective lubricating portions of the gear transmission mechanism 103 and between the first and second main shafts 105, 106. Therefore, even when a centrifugal force in association with the revolution acts on oil in the first hydraulic chamber 137 in the depressurized state, and hence a force to pressurize the first piston 135 is generated, the centrifugal force acts also on the oil in the canceller chamber 139, and hence a state in which the first piston 135 is moved to a position which sandwiches the first and second friction discs 132, 133 with the first pressure receiving plate 134 unintentionally is avoided.

The second clutch 125 is arranged so as to be juxtaposed with the first clutch 124 in the direction extending along the axial line of the second main shaft 106 so as to interpose the first clutch 124 between the primary reduction device 101 and the second clutch 125 itself, and includes the clutch outer 126, a second clutch inner 141 coaxially surrounded by the clutch outer 126 and coupled with the second main shaft 106 so as not to be capable of rotating with respect to each other, a plurality of third friction discs 142 engaged with the clutch outer 126 so as not to be capable of rotating with respect to each other, fourth friction discs 143 engaged with the second clutch inner 141 so as not to be capable of rotating with respect to each other and arranged alternately with the third friction discs 142, a second pressure receiving plate 144 provided on the second clutch inner 141 so as to oppose the third and fourth friction discs 142, 143 arranged so as to be overlapped with each other, a second piston 145 which interposes the third and fourth friction discs 142, 143 between the second pressure receiving plate 144 and the second piston 145 itself, and a second spring 146 which urges the second piston 145.

An end wall member 148 which defines a second hydraulic chamber 147 to which the back surface of the second piston 145 faces between the second piston 145 and the end wall member 148 itself is fixedly disposed on the second clutch inner 141, and the second piston 145 moves so as to sandwich with a pressure the third and fourth friction discs 142, 143 with the second pressure receiving plate 144 with the increase in hydraulic pressure in the second hydraulic chamber 147, whereby a connection state where the second clutch 125 transmits the power transmitted from the crankshaft 36 to the clutch outer 126 to the second main shaft 106 is assumed. A canceller chamber 149 to which the front surface of the second piston 145 faces is formed between the second clutch inner 141 and the second piston 145, and the second spring 146 is stored in the canceller chamber 149 so as to demonstrate its spring force in the direction to reduce the capacity of the second hydraulic chamber 147.

In addition, the canceller chamber 149 is in communication with a second oil passage 150. Therefore, even when a centrifugal force in association with the revolution acts on oil in the second hydraulic chamber 147 in the depressurized state, and hence a force to pressurize the second piston 145 is generated, the centrifugal force acts also on the oil in the canceller chamber 149, and hence a state in which the second piston 145 is moved to a position which sandwiches the third and fourth friction discs 142, 143 with the second pressure receiving plate 144 unintentionally is avoided.

First, second, and third diaphragm members 151, 152, 153 are mounted on the inner surface of the clutch cover 92 which covers the first and second clutches 124, 125 from the right side when viewing the front of the motorcycle in the direction of travel. Therefore, a first cylindrical member 155 which defines a first oil channel 154 which communicates with the first hydraulic chamber 137 of the first clutch 124 is provided between the second main shaft 106 and the first diaphragm member 151, a second cylindrical member 156 which defines the annular second oil passage 150 which communicates with the canceller chamber 149 of the second clutch 125 between the first cylindrical member 155 and the second cylindrical member 156 itself and coaxially surrounds the first cylindrical member 155 is provided between the second main shaft 106 and the second diaphragm member 152, and a third cylindrical member 158 which defines an annular second oil channel 157 which communicates with the second hydraulic chamber 147 between the second cylindrical member 156 and the third cylindrical member 158 itself and coaxially surrounds the second cylindrical member 156 is provided between the second main shaft 106 and the third diaphragm member 153.

Referring now to FIG. 2, a water pump 208 is mounted on the left side surface of the crankcase 35 at a position below the power generator cover 87, and first and second oil pump 209, 210 and a scavenge pump 211 are stored in the crankcase 35 coaxially with the water pump 208, and the first and second oil pump 209, 210 and the scavenge pump 211 rotate with the water pump 208. Therefore, the rotational power from the driven gear 129 of the primary reduction device 101 is transmitted to the first and second oil pump 209, 210 and the scavenge pump 211 via an endless chain 212 and, as shown in FIG. 8, a drive sprocket 213 engaged with the driven gear 129 so as not to be capable of rotating with respect to each other is rotatably supported by the first main shaft 105, and the chain 212 is wound around a driven sprocket 214 commonly connected to the water pump 208, the first and second oil pump 209, 210, and the scavenge pump 211 and the drive sprocket 213.

In FIG. 9, the first oil pump 209 switches the first and second clutches 124, 125 of the clutch device 102 between connection and disconnection, and discharges the hydraulic pressure for switching the intake-side valve operating state changing mechanism 63 and the exhaust-side valve operating state changing mechanism 64 of the rear-bank-side valve mechanism 48R, whereby the oil pumped up from the oil pan 41 and discharged from the first oil pump 209 is supplied to a common oil channel 215 which is common to the clutch device 102 and the rear-bank-side valve mechanism 48R. The common oil channel 215 is an oil channel in a range surrounded by a chain line in FIG. 9, and a relief valve 217 is connected to the common oil channel 215 and a first oil filter 216 is provided therein. The oil purified by the first oil filter 216 flows separately to first and second bifurcated oil channel 218, 219 bifurcated from the common oil channel 215, and the first bifurcated oil channel 218 is connected to a clutch hydraulic control apparatus 220 which switches the clutch device 102 between disconnection and connection. The second bifurcated oil channel 219 is connected to a valve hydraulic control apparatus 221 which switches the intake-side valve operating state changing mechanism 63 and the exhaust-side valve operating state changing mechanism 64 of the rear-bank-side valve mechanism 48R, and a decompression valve 222 is provided in the second bifurcated oil channel 219.

The second oil pump 210 is a member that supplies oil for lubrication to the respective lubricating portions of the engine E, and the oil pumped up from the oil pan 41 and discharged from the second oil pump 210 passes through an oil channel 223 and is supplied to a second oil filter 225, and a relief valve 224 is connected to a midsection of the oil channel 223. The oil purified by the second oil filter 225 is guided to an oil channel 228 in which an oil cooler 226 is provided therein, and a pressure sensor 227 is connected to the oil channel 228.

The oil from the oil channel 228 is supplied to a lubricating system 229 around the first and second main shafts 105, 106 in the gear transmission mechanism 103, a lubricating system 230 around the counter shaft 107 in the gear transmission mechanism 103, and a plurality of lubricating system 231 in the engine body 33. In addition, the oil from the lubricating system 229 around the first and second main shafts 105, 106 is guided to the first oil passage 140 which is in communication with the canceller chamber 139 of the first clutch 124. The oil from the lubricating system 231 is supplied to the second oil passage 150 which is in communication with the canceller chamber 149 in the second clutch 125 via an aperture 232, and an electromagnetic opening-and-closing valve 233 for supplying oil to the canceller chamber 149 quickly is connected to the aperture 232 in parallel.

Referring also to FIG. 10 to FIG. 13, the clutch hydraulic control apparatus 220 includes a first electromagnetic control valve 235 which switches the hydraulic pressure to the first hydraulic chamber 137 in the first clutch 124 between applying and releasing and a second electromagnetic control valve 236 which switches the hydraulic pressure to the second hydraulic chamber 147 in the second clutch 125 between applying and releasing, and is arranged on the right side of the front cylinder block 38F and mounted on the outer surface of the clutch cover 92. In addition, the clutch cover 92 includes a projection 92a projecting sideward and outward so as to store the clutch device 102 at a position corresponding to the clutch device 102, an extension 92b extending from the projection 92a sideward to the right of the front cylinder block 38F, and the clutch hydraulic control apparatus 220 is mounted on the extension 92b.

The clutch cover 92 includes an oil channel 237 which connects the first oil channel 154 in communication with the first hydraulic chamber 137 of the first clutch 124 and the first electromagnetic control valve 235, and an oil channel 238 which connects the second oil channel 157 in communication with the second hydraulic chamber 147 of the second clutch 125 and the second electromagnetic control valve 236.

Referring now to FIG. 11, the first oil filter 216 includes a filter member 243 stored in a filter case 234, and the filter case 234 includes a cylindrical case main portion 239 which is formed with a bottomed storage hole 240 having an opened outer end and being integrally formed with the clutch cover 92, and a lid member 241 detachably mounted on the case main portion 239.

The case main portion 239 is integrally provided with the clutch cover 92 so as to project at least partly from the clutch cover 92, and the cylindrical filter member 243 is stored in the filter case 234 so as to be surrounded by the case main portion 239 and is supported by a supporting frame 242 held between the closed portion at an inner end of the storage hole 240 and the lid member 241 and stored in the filter case 239. Therefore, an annular unpurified chamber 244 is formed around the filter member 243 and a purified chamber 245 is formed in the filter member 243.

The first oil filter 216 as such is arranged below the crankshaft 36 and outwardly of the clutch device 102 when viewed in the direction along the axial line of the clutch device 102, in this embodiment, at the obliquely lower front of the clutch device 102 as shown in FIG. 3 and FIG. 10. As shown in FIG. 11 to FIG. 13, the first oil filter 216 is arranged inwardly of a vertical line L1 which passes an outermost end of the projection 92a of the clutch cover 92. In other words, the first oil filter 216 is arranged inwardly of a portion of the clutch cover 92 which projects outward from the crankcase 35 most in terms of the axial direction of the crankshaft 36.

A connecting member 246 is fastened to the inner surface of the clutch cover 92 at a portion corresponding to the first oil filter 216. An oil channel forming member 247 is fastened to the inner surface of the clutch cover 92 near the clutch hydraulic control apparatus 220 with the intermediary of a flat panel shaped diaphragm member 248 between the clutch cover 92 and the oil channel forming member 247 itself, and an oil channel 249 is defined between the oil channel forming member 247 and the diaphragm member 248. Therefore, the connecting member 246 is formed with a connecting oil channel 250 which communicates with the purified chamber 245 of the first oil filter 216, and one end of a connecting tube 251 communicating with the connecting oil channel 250 and extending toward the oil channel forming member 247 is fitted to the connecting member 246 in a liquid tight manner. The other end of the connecting tube 251 is fitted to a coupling member 252, and the coupling member 252 is fitted to a cylindrical fitting cylindrical member 248a provided on the diaphragm member 248 in a liquid tight manner. The oil channel 249 between the oil channel forming member 247 and the diaphragm member 248 and oil channels 253, 254 which connect the first and second electromagnetic control valves 235, 236 respectively are provided on the clutch cover 92.

Therefore, the purified chamber 245 of the first oil filter 216 is connected to the connecting oil channel 250, the connecting tube 251, the coupling member 252, the oil channel 249, and the oil channels 253, 254, and the connecting tube 251, the coupling member 252, the oil channel 249, and the oil channels 253, 254 constitute the first bifurcated oil channel 218 described in conjunction with FIG. 9.

A portion of the common oil channel 215 between the first oil pump 209 and the first oil filter 216 includes an oil channel 255 provided in the crankcase 35 via an discharge port of the first oil pump 209, and a connecting tube 256 which connects the oil channel 255 and the unpurified chamber 244, and both ends of the connecting tube 256 are fitted to the end of the oil channel 255 and the clutch cover 92 in a liquid-tight manner. Therefore, the oil channel 255, the connecting tube 256, the unpurified chamber 244 and the purified chamber 245 of the oil filter 216, and the connecting oil channel 250 constitute the common oil channel 215 described in conjunction with FIG. 9.

A valve housing 257 of the decompression valve 222 is coupled to the clutch cover 92 together with the connecting member 246 so as to interpose the connecting member 246 between the inner surface of the clutch cover 92 and the valve housing 257. The decompression valve 222 is configured with a valve body 259 slidably fitted so as to define an oil chamber 258 between one end of the valve housing 257 and the valve body 259 itself and a spring 260 that urges the valve body 259 in the direction to reduce the capacity of the oil chamber 258 provided between a spring receiving member 267 provided on the side of the other end of the valve housing 257 and the valve body 259.

Therefore, the connecting member 246 and the valve housing 257 include a path 261 which connects the oil channel 250 in the connecting member 246 and the oil chamber 258, and the path 261 corresponds to the branch point of the first and second bifurcated oil channel 218, 219, that is, the downstream end of the common oil channel 215.

The decompression valve 222 decompresses the hydraulic pressure in the oil chamber 258 regularly by the valve body 259 which slides in an reciprocating manner so as to equalize the hydraulic pressure force generated by the hydraulic pressure in the oil chamber 258 and the spring force of the spring 260, and the hydraulic pressure reduced by the decompression valve 222 is guided to the valve hydraulic control apparatus 221.

By the arrangement of the decompression valve 222 as described above, the decompression valve 222 is arranged at the nearest position of the first oil filter 216 and, as clearly shown in FIG. 10, at least part of the decompression valve 222 when viewed in the direction of the axial line of the first oil filter 216 is arranged so as to be overlapped with the first oil filter 216.

Referring now to FIG. 2 and FIG. 6, the valve hydraulic control apparatus 221 includes a pair of electromagnetic control valves 262, 262 which correspond respectively to the two cylinders of the rear bank BR individually, and is mounted on the side surface of the engine body 33 on the opposite side from the cam chain 99 of the rear-bank-side timing-control transmission mechanism 98 in the direction along the axial line of the intake-side camshaft 57 and the exhaust-side camshaft 58 in the rear bank BR and, in this embodiment, is mounted on the left side surface of the rear cylinder head 39R of the rear bank BR.

Therefore, the one electromagnetic control valve 262 controls the hydraulic pressure of the intake-side and exhaust-side valve operating state changing mechanisms 63, 64 in one of the two cylinders, and the other electromagnetic control valve 262 controls the hydraulic pressure of the intake-side and exhaust-side valve operating state changing mechanisms 63, 64 in the other cylinder.

Referring also to FIG. 2, FIG. 10 and FIG. 11, the oil decompressed by the decompression valve 222 is guided to the valve hydraulic control apparatus 221 via a connecting tube 264 connected at one end to the valve housing 257 and extending in the direction away from the clutch cover 92, an oil channel 265 connected to the other end of the connecting tube 264 and provided in the crankcase 35 so as to extend in parallel with the axial line of the crankshaft 36 to the left side surface of the crankcase 35 and an oil channel 266 provided on the side of the left surfaces of the crankcase 35, the rear cylinder block 38R, and the rear cylinder head 39R for connecting the oil channel 265 and the valve hydraulic control apparatus 221, and the second bifurcated oil channel 219 having the decompression valve 222 provided therein includes the path 261, the connecting tube 264, and the oil channels 265, 266.

In other words, at least a part of the common oil channel 215 which connects the valve hydraulic control apparatus 221 and the first oil pump 209 and the second bifurcated oil channel 219, in this embodiment, the oil channel 266 from among the connecting tube 264 and the oil channels 265, 266 which constitute the second bifurcated oil channel 219 is formed on the side of the other ends of the intake-side and exhaust-side camshafts 57, 58 in the rear bank BR, that is, on the side of the left side surfaces of the crankcase 35, the rear cylinder block 38R, and the rear cylinder head 39R of the engine body 33.

As shown in FIG. 3, FIG. 10, FIG. 12, and FIG. 13, the second oil filter 225 is mounted on the right side surface of the crankcase 35 at a position forwardly of the first oil filter 216 and inwardly of the first oil filter 216 (near the center of the vehicle body) in terms of the axial direction of the crankshaft 36.

An oil temperature detector 273 as the oil state detector for detecting the state of the hydraulic oil to be supplied to the clutch device 102 and the rear-bank-side valve mechanism 48R such as the viscosity is provided in the common oil channel 215 common to the clutch device 102 and the rear-bank-side valve mechanism 48R.

In addition, the oil temperature detector 273 is provided on the first oil filter 216, and is provided on a side wall of a portion of the case main portion 239 provided integrally with the clutch cover 92 of the filter case 234 of the first oil filter 216 projecting from the clutch cover 92 so as to detect the temperature in the unpurified chamber 244 which constitutes a part of the common oil channel 215. Therefore, the first oil filter 216 is arranged axially inwardly of the portion of the clutch cover 92 which is projected outward from the crankcase 35 most, and the oil temperature detector 273 is provided on the case main portion 239. Therefore, the oil temperature detector 273 is also arranged axially inwardly of a portion of the clutch cover 92 projecting outward from the crankcase 35 most.

As shown in FIG. 12, the oil temperature detector 273 is arranged at a position below the projection 92a of the clutch cover 92 and facing toward the rear, and the arrangement of the oil temperature detector 273 as such simplifies the operation to mount and demount the oil temperature detector 273 from behind the engine E.

As shown in FIG. 13, in the front view viewing the motorcycle from the front, the oil temperature detector 273 is arranged at a position which is hidden by the first oil filter 216.

Subsequently, the operation of the first embodiment will be described. The first and second bifurcated oil channel 218, 219 which are bifurcated from the common oil channel 215 which continues to the first oil pump 209 are connected to the clutch device 102 and the rear-bank-side valve mechanism 48R respectively, and the oil temperature detector 273 is provided in the common oil channel 215. Therefore, it is not necessary to provide the oil temperature detector each for the clutch device 102 and the rear-bank-side valve mechanism 48R, and one oil temperature detector 273 for both the clutch device 102 and the rear-bank-side valve mechanism 48R is sufficient, so that reduction of the number of components is achieved.

The case main portion 239 which constitutes a part of the filter case 234 of the first oil filter 216 provided in the common oil channel 215 is integrally provided with the clutch cover 92 so as to be protruded at least partly from the clutch cover 92, and the oil temperature detector 273 is provided at a portion of the case main portion 239 projected from the clutch cover 92. Therefore, the oil temperature detector 273 is able to be arranged in a relatively wide range around the filter member 243 stored in the case main portion 239, so that the flexibility of the arrangement is enhanced.

In addition, since the first oil filter 216 and the oil temperature detector 273 are arranged in a portion of the clutch cover 92 at positions inwardly of portion protruded outward from the crankcase 35 most, increase in width of the power system P is restrained by the provision of the first oil filter 216 and the oil temperature detector 273 on the clutch cover 92.

Also, since the oil temperature detector 273 is located at a position hidden by the first oil filter 216 in front view, muddy water or the like from the front can hardly attach the oil temperature detector 273.

Figure 14:
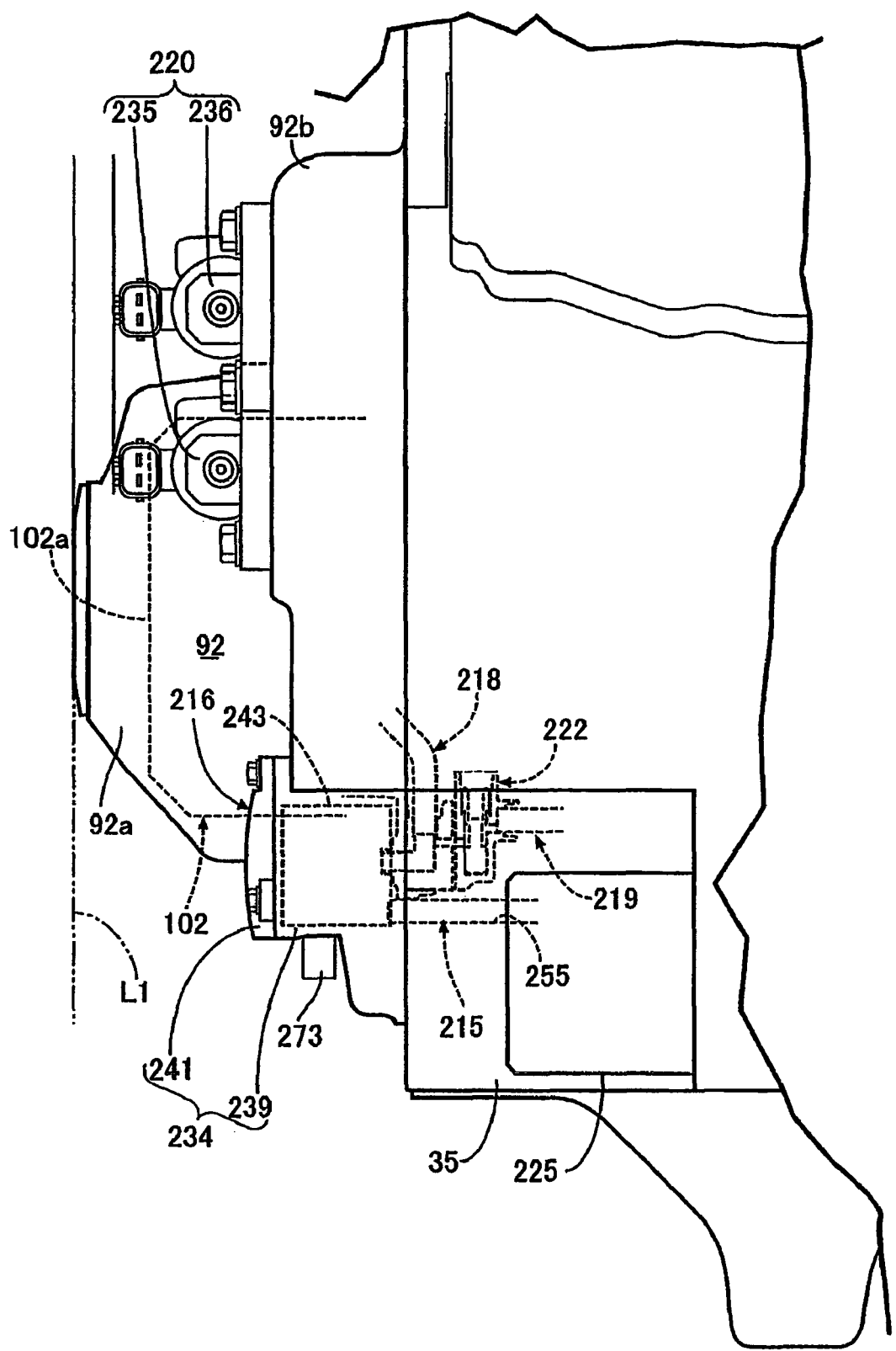
FIG. 14 is a drawing corresponding to FIG. 13 in the second embodiment.

FIG. 14 shows a second embodiment of the present invention, and components corresponding to the first embodiment are simply represented by the same reference numerals, and detailed description will be omitted.

The oil temperature detector 273 is provided in the case main portion 239 which constitutes part of the filter case 234 of the first oil filter 216 and is provided integrally with the clutch cover 92 in a portion protruded from the clutch cover 92, and is arranged at a position which is avoided from being hidden by the first oil filter 216 when viewing the motorcycle from the front.

According to the second embodiment, the cooling property is enhanced by allowing the oil temperature detector 273 to receive air easily from the front while the motorcycle is traveling.

Figure 15:
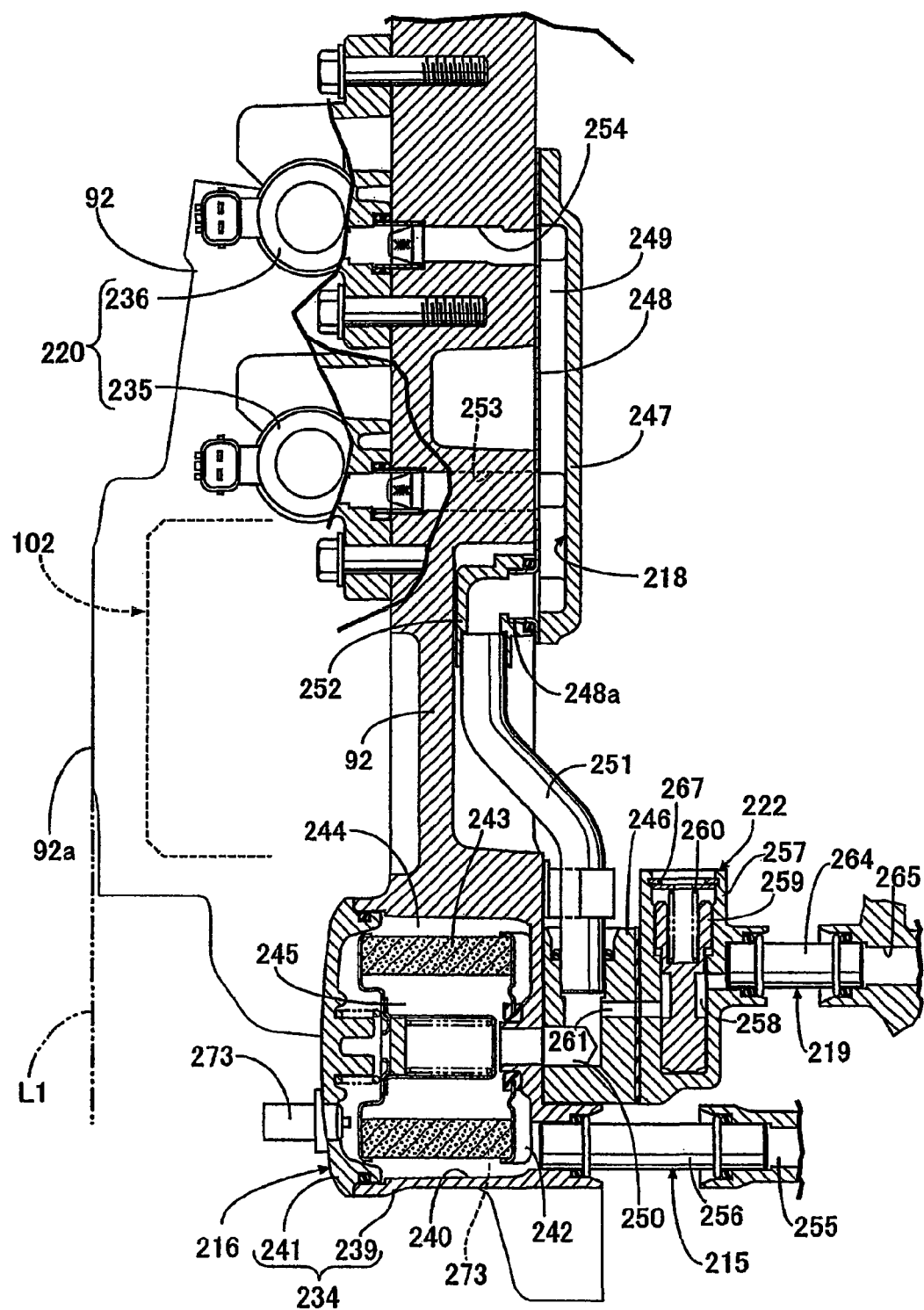
FIG. 15 is a drawing corresponding to FIG. 11 in the third embodiment.

FIG. 15 shows a third embodiment of the present invention, and portions which correspond to the first and second embodiments are simply represented by the same reference numerals, and the detailed description is omitted.

The oil temperature detector 273 is provided on the lid member 241 which constitutes a part of the filter case 234 of the first oil filter 216 and is detachably mounted on the case main portion 239.

According to the third embodiment as described above, the maintenance of the oil temperature detector 273 can be carried out together when the lid member 241 is removed for the maintenance of the filter member 243, so that the working efficiency of the maintenance operation can be enhanced.

Figure 16:
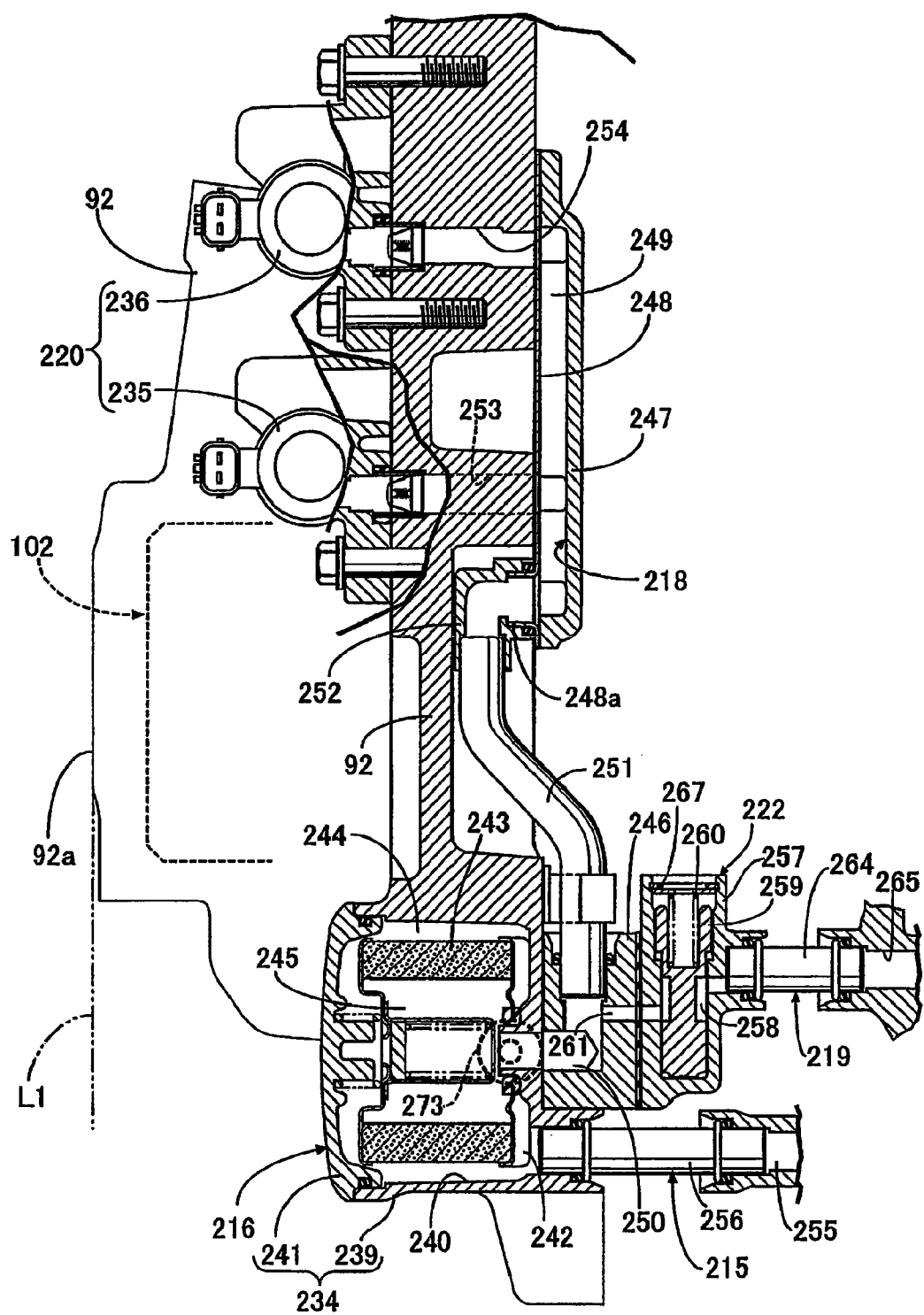
FIG. 16 is a drawing corresponding to FIG. 11 in the fourth embodiment.

FIG. 16 shows a fourth embodiment of the present invention, and portions which correspond to the first to the third embodiments are simply represented by the same reference numerals, and the detailed description is omitted.

The oil temperature detector 273 is provided in the common oil channel 215 on the downstream side of the first oil filter 216, and provided in the clutch cover 92 so as to be connected between the purified chamber 245 in the first oil filter 216 and the connecting oil channel 250 formed on the connecting member 246.

According to the fourth embodiment, since the oil temperature detector 273 is provided in the common oil channel 215 on the downstream side of the first oil filter 216, attachment of foreign substances on the oil temperature detector 273 is restrained, so that the detection accuracy is enhanced.

Since the first oil filter 216 and the oil temperature detector 273 are provided on the clutch cover 92 attached detachably to the crankcase 35, attachment and detachment of the first oil filter 216 and the oil temperature detector 273 to and from the crankcase 35 are performed at once, so that enhancement of the efficiency of the attachment and detachment of the first oil filter 216 and the oil temperature detector 273 is achieved.

Although the embodiments of the present invention have been described, the present invention is not limited to the embodiments described above, and various modifications in design may be made without departing from the invention described in claims.

For example, although the case where the oil temperature detector 273 is used as the oil state detector has been described in the embodiments shown above, the invention may be applied to a case where a detector which directly detects the viscosity of the hydraulic oil or a detector for detecting the hydraulic pressure as an oil state detector is used.

According to the embodiment of the invention as described above, since the oil state detector is provided in the common oil channel on the downstream side of the oil filter which filters the hydraulic oil, attachment of foreign substances on the oil state detector is restrained, so that the detection accuracy is enhanced.

According to the embodiment of the invention as described above, since the filter case for storing the filter member is configured with the case main portion, and the oil state detector is provided on the lid member which is detachably mounted on the case main portion, the maintenance of the oil state detector can be carried out together when the lid member is removed for the maintenance of the filter member, so that the working efficiency of the maintenance can be enhanced.

According to the embodiment of the invention as described above, since the oil filter and the oil state detector are provided in the clutch cover which is detachably mounted on the crankcase, attachment and detachment of the oil filter and the oil state detector from the crankcase are achieved at once, so that the efficiency of the attachment and detachment of the oil filter and the oil state detector can be enhanced.

According to the embodiment of the invention as descried above, a part of the component of the filter case is provided integrally with the clutch cover so as to be protruded at least partly from the clutch cover, and includes a cylindrical case main portion which surrounds the filter member, and oil state detector is provided on a portion of the case main portion protruded from the clutch cover. Therefore, the oil state detector is able to be arranged in a relatively wide range around the filter member, so that the flexibility of the arrangement is enhanced.

According to the embodiment of the invention as described above, since the oil filter and the oil state detector are arranged inwardly of a portion of the clutch cover protruded outward from the crankcase most, increase in width of the power system is restrained by the provision of the oil filter and the oil state detector on the clutch cover.

According to the embodiment of the invention as described above, since the oil state detector is located at a position hidden by the oil filter in front view, muddy water or the like from the front can hardly attach the oil state detector.

According to the embodiment of the invention as described above, since the oil state detector is located at a position which is not hidden by the oil filter in the front view, the cooling property is enhanced by allowing the oil state detector to receive air easily from the front while traveling.

What is claimed as new and desired to be secured by Letters Patent of the United States is:

1. A power system for a vehicle, comprising:
a hydraulic pressure generating device;
a first hydraulically operated device configured to be operated by liquid supplied from the hydraulic pressure generating device;
a second hydraulically operated device configured to be operated by liquid supplied from the hydraulic pressure generating device;
a common oil channel connected to the hydraulic pressure generating device;
a first bifurcated oil channel connecting the common oil channel and the first hydraulically operated device;
a second bifurcated oil channel connecting the common oil channel and the second hydraulically operated device;
an oil state detector provided in the common oil channel and configured to detect the state of the liquid; and
an oil filter configured to filter the liquid and provided in the common oil channel,
wherein the oil filter comprises
a filter case comprising:
a case main portion connected to an oil channel forming member which forms at least part of the common oil channel; and a lid member which is detachably mounted on the case main portion and on which the oil state detector is provided, and a filter member stored in the filter case.

2. A power system for a vehicle, comprising:

a hydraulic pressure generating device;

a first hydraulically operated device configured to be operated by liquid supplied from the hydraulic pressure generating device;

a second hydraulically operated device configured to be operated by liquid supplied from the hydraulic pressure generating device;

a common oil channel connected to the hydraulic pressure generating device;

a first bifurcated oil channel connecting the common oil channel and the first hydraulically operated device;

a second bifurcated oil channel connecting the common oil channel and the second hydraulically operated device;

an oil state detector provided in the common oil channel and configured to detect the state of the liquid; and an oil filter configured to filter the liquid and provided in the common oil channel, wherein a clutch cover which forms a clutch storage chamber with a crankcase which rotatably supports a crankshaft is detachably mounted on the crankcase, and wherein the oil filter and the oil state detector are provided in the clutch cover.

3. The power system according to claim 2, wherein the oil filter comprises a filter case including a cylindrical case main portion which is provided integrally with the clutch cover and has a protruding portion protruding from the clutch cover, and a filter member stored in the filter case, and wherein the oil state detector is provided at the protruding portion of the case main portion.

4. The power system according to claim 2, wherein the oil filter and the oil state detector are arranged inside an outermost portion of the clutch cover protruded outward from the crankcase.

5. The power system according to claim 2, wherein the oil state detector is arranged to be hidden by the oil filter when viewed from a front of the vehicle.

6. The power system according to claim 2, wherein the oil state detector is arranged to be seen when viewed from a front of the vehicle.

7. A vehicle comprising:

a hydraulic pressure generating device;

a first hydraulically operated device configured to be operated by liquid supplied from the hydraulic pressure generating device;

a second hydraulically operated device configured to be operated by liquid supplied from the hydraulic pressure generating device;

a common oil channel connected to the hydraulic pressure generating device;

a first bifurcated oil channel connecting the common oil channel and the first hydraulically operated device;

a second bifurcated oil channel connecting the common oil channel and the second hydraulically operated device;

an oil state detector provided in the common oil channel and configured to detect the state of the liquid; and an oil filter configured to filter the liquid and provided in the common oil channel, wherein the oil filter comprises a filter case comprising:

a case main portion connected to an oil channel forming member which forms at least part of the common oil channel; and a lid member which is detachably mounted on the case main portion and on which the oil state detector is provided, and a filter member stored in the filter case.

8. A vehicle comprising:

a hydraulic pressure generating device;

a first hydraulically operated device configured to be operated by liquid supplied from the hydraulic pressure generating device;

a second hydraulically operated device configured to be operated by liquid supplied from the hydraulic pressure generating device;

a common oil channel connected to the hydraulic pressure generating device;

a first bifurcated oil channel connecting the common oil channel and the first hydraulically operated device;

a second bifurcated oil channel connecting the common oil channel and the second hydraulically operated device;

an oil state detector provided in the common oil channel and configured to detect the state of the liquid; and an oil filter configured to filter the liquid and provided in the common oil channel, wherein a clutch cover which forms a clutch storage chamber with a crankcase which rotatably supports a crankshaft is detachably mounted on the crankcase, and wherein the oil filter and the oil state detector are provided in the clutch cover.

9. The vehicle according to claim 8, wherein the oil filter comprises a filter case including a cylindrical case main portion which is provided integrally with the clutch cover and has a protruding portion protruding from the clutch cover, and a filter member stored in the filter case, and wherein the oil state detector is provided at the protruding portion of the case main portion.

10. The vehicle according to claim 8, wherein the oil filter and the oil state detector are arranged inside an outermost portion of the clutch cover protruded outward from the crankcase.

11. The vehicle according to claim 8, wherein the oil state detector is arranged to be hidden by the oil filter when viewed from a front of the vehicle.

12. The vehicle according to claim 8, wherein the oil state detector is arranged to be seen when viewed from a front of the vehicle.

* * * * *